United States Patent [19]
Yamauchi et al.

[11] Patent Number: 5,995,398
[45] Date of Patent: Nov. 30, 1999

[54] POWER SUPPLY DEVICE

[75] Inventors: Tokushi Yamauchi; Minoru Maehara; Yoshinobu Murakami; Minoru Yamamoto, all of Osaka, Japan

[73] Assignee: Matsushita Electric Works, Ltd, Osaka, Japan

[21] Appl. No.: 09/063,013

[22] Filed: Apr. 21, 1998

Related U.S. Application Data

[60] Provisional application No. 60/059,777, Sep. 23, 1997.

[51] Int. Cl.$^6$ .......................... H02M 7/5387; H02M 3/24
[52] U.S. Cl. ................................ 363/98; 363/37; 363/132
[58] Field of Search .................................. 363/16, 17, 37, 363/39, 40, 41, 43, 97, 98, 131, 132

[56] References Cited

U.S. PATENT DOCUMENTS

| | | | |
|---|---|---|---|
| 3,753,071 | 8/1973 | Engel et al. | 363/37 |
| 4,677,345 | 6/1987 | Nilssen | 363/132 X |
| 5,644,480 | 7/1997 | Sako et al. | 363/17 |

FOREIGN PATENT DOCUMENTS

| | | |
|---|---|---|
| 4-193067 | 7/1992 | Japan . |
| 5-38161 | 2/1993 | Japan . |
| 7-288984 | 10/1995 | Japan . |

OTHER PUBLICATIONS

Copy of an English Language Abstract of JP No. 4–193067.
Copy of an English Language Abstract of JP No. 5–38161.
Copy of an English Language Abstract of JP No. 7–288984.

*Primary Examiner*—Peter S. Wong
*Assistant Examiner*—Y. J. Han
*Attorney, Agent, or Firm*—Greenblum & Bernstein, P.L.C.

[57] ABSTRACT

A power supply device for a discharge lamp has a rectifier for rectification of an AC voltage from an AC voltage source into an output DC voltage, a smoothing capacitor connected across the rectifier for providing a smoothed DC voltage, and an inverter which receives the smoothed DC voltage to provides a high frequency output to the lamp. The inverter includes a composite resonant circuit with first and second resonant systems each including an impedance element. The lamp is connected across the impedance element of the first resonant system. A balancing circuit is included to combine the high frequency powers fed respectively through the first and second resonant systems in a direction of canceling the high frequency powers with each other to provide a combined high frequency power. A feedback arrangement is included to superimpose the combined high frequency power upon the output DC voltage of the rectifier so as to feedback the resulting power to an input of the inverter for flowing a charge current for the smoothing capacitor. The first and second resonant systems are arranged to vary an amount of the combined high frequency power provided from the balancing means in response to a varying load condition of the lamp for reducing the canceling effect at the balancing means as the high frequency power supplied to the lamp increases.

9 Claims, 25 Drawing Sheets

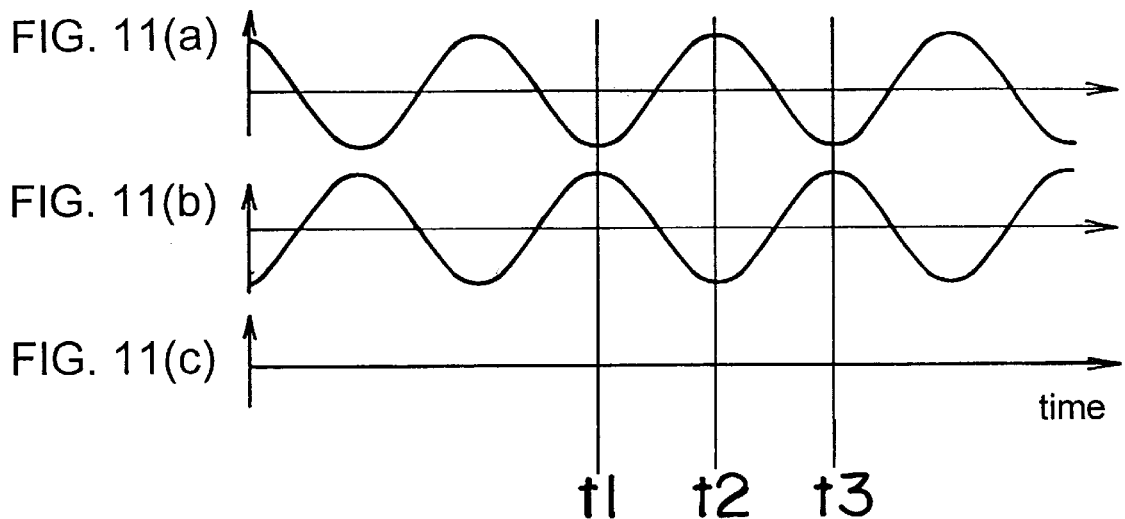
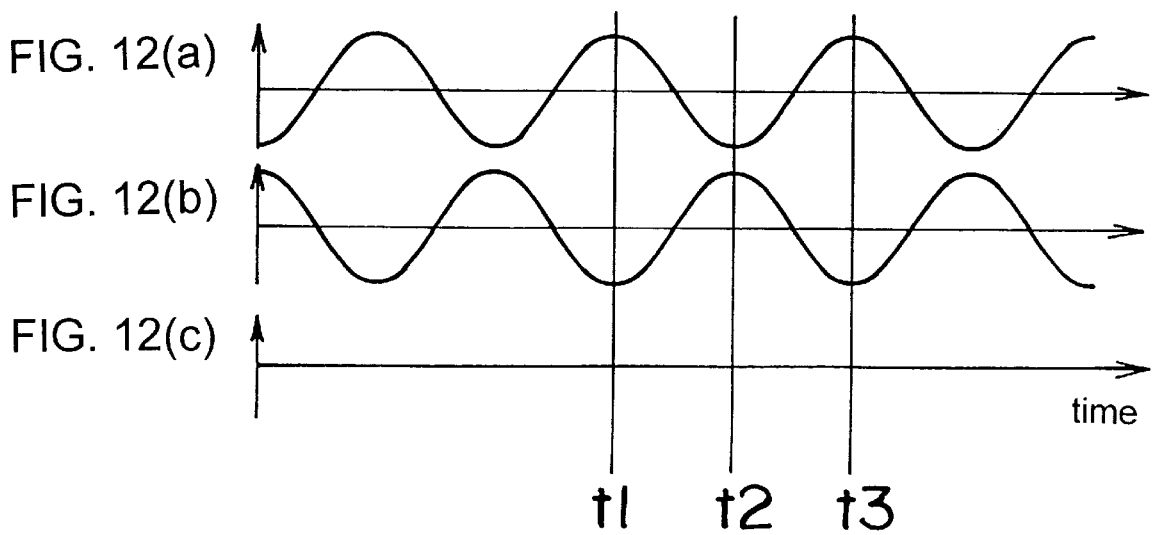

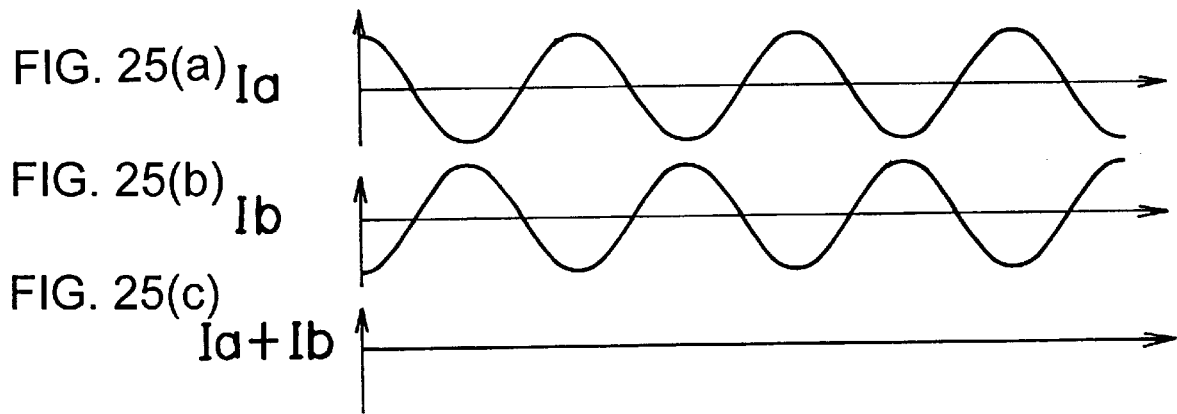
FIG. 25(a) Ia
FIG. 25(b) Ib
FIG. 25(c) Ia+Ib
FIG. 26
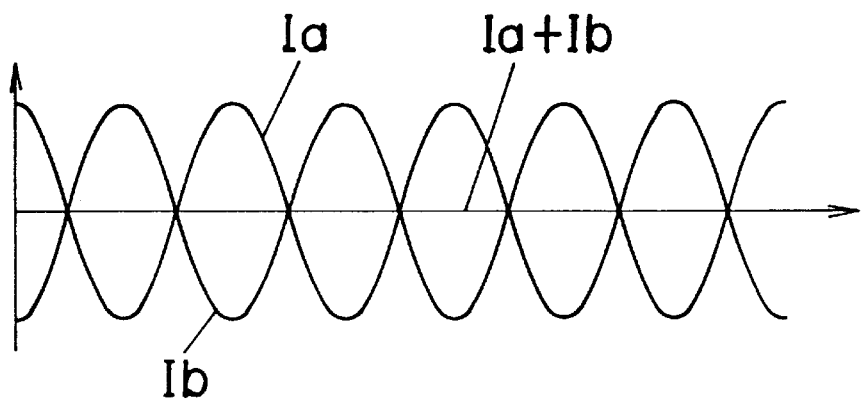

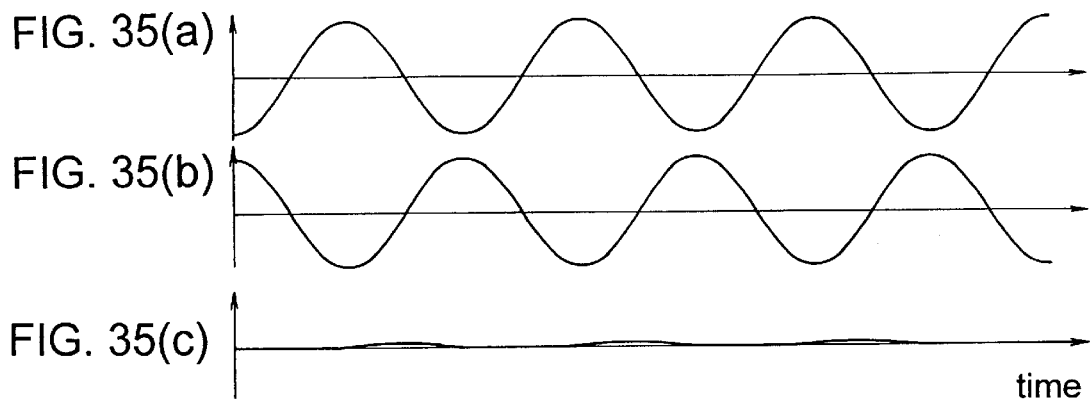
FIG. 35(a)
FIG. 35(b)
FIG. 35(c)
time
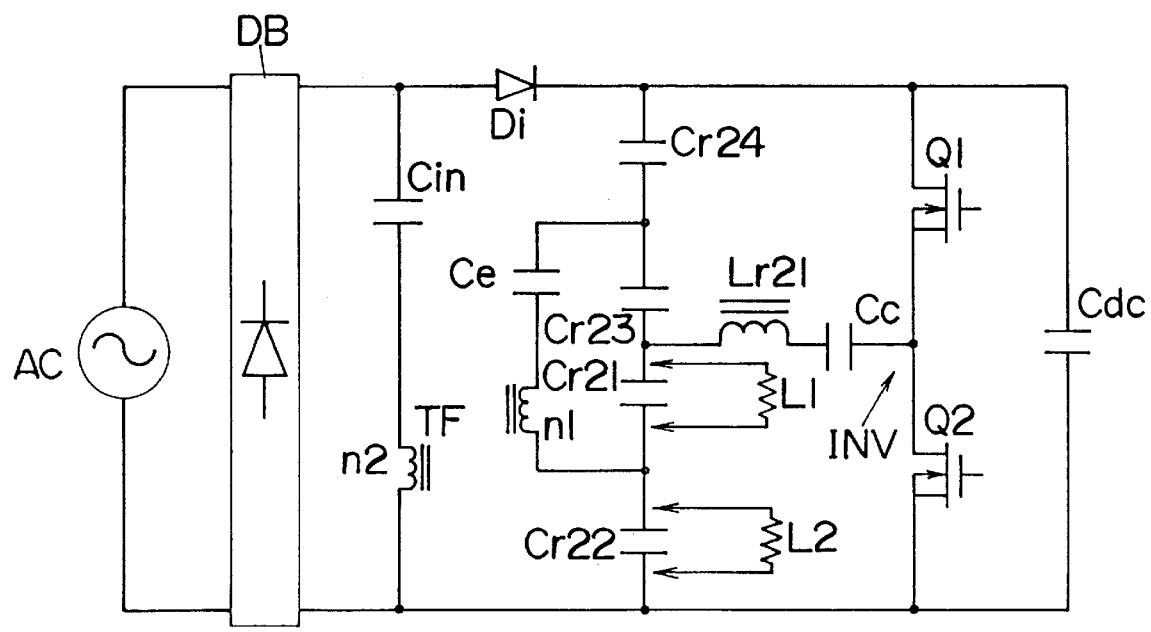
FIG. 36

POWER SUPPLY DEVICE

This application claims the benefit of U.S. Provisional Application No. 60/059,777, filed Sep. 23, 1997, the contents of which are herein incorporated by reference in its entirety.

BACKGROUND ART

Conventionally, there has been provided a power supply device for transforming a relatively low frequency AC voltage such as from a commercial voltage source into a high frequency current. Such power supply device is required to solve a technical problem of restraining input current distortion while maintaining a high input power factor. In order to solve the technical problem, a prior power supply device has been proposed which includes a power factor improving circuit, for example, composed of a step-up chopper to convert an AC voltage into a DC voltage, and an inverter for converting the resulting DC voltage into a high frequency power. That is, various prior power supply devices have been proposed to include the chopper for AC-to-DC conversion and the inverter for DC-to-AC conversion.

However, the chopper requires a relatively large number of components which makes the device bulky with attendant increase in component cost. In view of this, the prior power supply devices have been configured to use the number of components less than the device in which the chopper and the inverter are formed separately from each other so as to achieve a compact and low-cost design.

FIG. 44 illustrates a circuit diagram equivalent to one embodiment of a power supply device disclosed in Japanese laid-open patent publication No. 4-193067. In this circuit configuration, a rectifier DB composed of a diode bridge makes a full-wave rectification of an AC voltage from a voltage source AC and a smoothing capacitor Cdc is connected in series with two diodes D1 and Di across output ends of the rectifier DB so as to convert the AC voltage into a DC voltage. A pair of switching elements Q1 and Q2 is connected across capacitor Cdc. Connected across switching element Q2 is a series circuit of a DC blocking capacitor Cc, an inductor Lrs, and a capacitor Crs across which a discharge lamp is connected as a load L. Switching elements Q1 and Q2 are cooperative with capacitor Cc to form an inverter INV of half-bridge configuration and are driven to turn on and off alternately at a frequency sufficiently higher than that of the voltage source AC. MOSFETs are utilized respectively as the switching elements Q1 and Q2. The inverter thus configured operates to provide a high frequency power from the voltage across capacitor Cdc and supply the resulting high frequency power to the load L through a resonant circuit of capacitor Crs and inductor Lrs. In this configuration, it is made to insert a distortion improving capacitor Cin between the inverter output (connection point of inductor Lrs to capacitor Crs) and a connection point of diodes D1 and Di in order to avoid an increase of an input current distortion for keeping a high input power factor.

Regarding the voltage applied across the load L as the high frequency voltage source, the circuit of FIG. 44 can be recognized to have a series circuit of capacitor Cin and the high frequency voltage source connected across the DC output ends of rectifier DB and to have capacitor Cdc connected across DC output ends of rectifier DB through diode Di. Since the series circuit of capacitor Cin and the high frequency voltage source develops thereacross a voltage which is equal to that of the DC output ends of rectifier DB, capacitor Cin is caused to repeat being charged and discharged in accordance with polarity of voltage developed across the high frequency voltage source. That is, two conditions occur alternately at a high frequency in one of which a charging current flows into capacitor Cin through diode D1 from rectifier DB, and in the other of which voltage across the high frequency voltage is added to voltage across capacitor Cin to apply the resulting voltage to capacitor Cdc. Since the input current from AC voltage source can be supplied at the high frequency through this operation, the input current continuously flows from the AC voltage source for restraining an increase in the input current distortion when a high frequency blocking filter is provided between the AC voltage source and capacitor Cin. Also with this configuration, the voltage across capacitor Cdc is held substantially constant and the voltage amplitude of the high frequency voltage source is held substantially constant such that the input current to capacitor Cin is made approximately proportional to the voltage of the AC voltage source with an attendant increase of the input power factor.

The like operation is also realized in a circuit of FIG. 45 which corresponds to one embodiment disclosed in Japanese laid-open publication No. 5-38161. In this circuit, a load L and a capacitor Crs have their one ends commonly connected to a point between diodes D1 and Di. Also, a capacitor Cin3 is utilized instead of capacitor Cin and is connected across diode Di so as to reduce the increase of input current distortion for keeping the high input power factor.

The above-mentioned prior circuit configurations are generally referred to as a charge-pump type in which capacitor Cin is charged by an input current from the AC voltage source and capacitor Cdc is charged by capacitor Cin. In the power supply device of the charge-pump type, the AC voltage source provides an input of flowing a charging current into capacitor Cdc even the load L consumes no substantial power in the no-load (or light-load) condition, giving an energy surplus between the input and output of the inverter and thereby leaving a problem that capacitor Cdc is caused to develop thereacross excessively increased voltage. With this result, the electronic components particularly the switching elements Q1 and Q2 must be selected to have high dielectric strength, which poses a problem of incurring high component cost.

Japanese Patent laid-open Publication No. 7-288984 discloses another prior power supply device in which feedback means is provided to feedback a portion of a high frequency output from an inverter through a plurality of paths to a smoothing capacitor so as to superimpose the portion of the high frequency output upon a voltage developed across the smoothing capacitor. The device is designed to differentiate the voltages fed-back through the individual paths with each other for reducing crest value of an input current to the device or regulating a current for charging the smoothing capacitor in accordance with the output from the inverter. However, the device necessitates a rather complicated configuration of regulating the frequency of the inverter in order to vary the feedback amount of the voltage from the inverter in anticipation of varying load conditions, for example, loading of a discharge lamp. In fact, the prior device fails to monitor the changing load condition and therefore fails to vary the feedback amount of the voltage in exact correspondence to the changing load condition. Thus, the prior device is not successful for limiting otherwise developed unduly high voltage at the smoothing capacitor over a wide range from a no-load condition, lamp-starting condition, and a normal lighting condition.

DISCLOSURE OF THE INVENTION

The power supply device in accordance with the present invention is configured to feed back a portion of a high frequency output of an inverter to an input of the inverter in order to repeat two alternate conditions at a frequency sufficiently higher than the frequency of the AC voltage source, one for drawing an input current from the AC voltage source, and the other for charging a smoothing capacitor which operates as a voltage source for the inverter. Also, the device is configured to develop a voltage across the smoothing capacitor at a level higher than the absolute voltage of the AC voltage source when drawing the input current from the AC voltage source. The inverter provides a high frequency electric power to a load through a resonant circuit having plural resonant systems. The load can be connected at such a point as to give an influence upon amplitude or phase of a voltage and/or current seen in one of the resonant systems. The voltage and/or current in each of the resonant systems is cancelled in the no-load condition so as not to be fed back, thereby reducing the input current from the AC voltage source to limit an increase in the voltage developed across the smoothing capacitor. Upon connection of the load, the resonant system to which the load is connected gives a voltage or current which differs from the voltage or current of another resonant system, which increases a feedback amount from the output of the inverter to the input thereof to thereby feed the input current from the AC voltage source in a high frequency mode. With the presence of such high frequency input current, the use of a high frequency blocking filter of small configuration is sufficient for giving continuity to the input current, which eventually restrains the increase in the input current distortion.

BRIEF DESCRIPTION OF THE INVENTION

Figure 3A:
Figure 3B:
Figure 3C:
Figure 4:
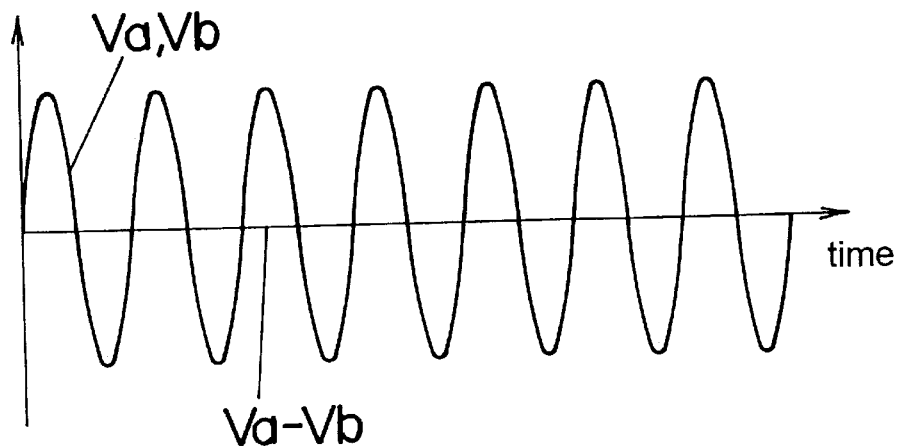
Figure 5:
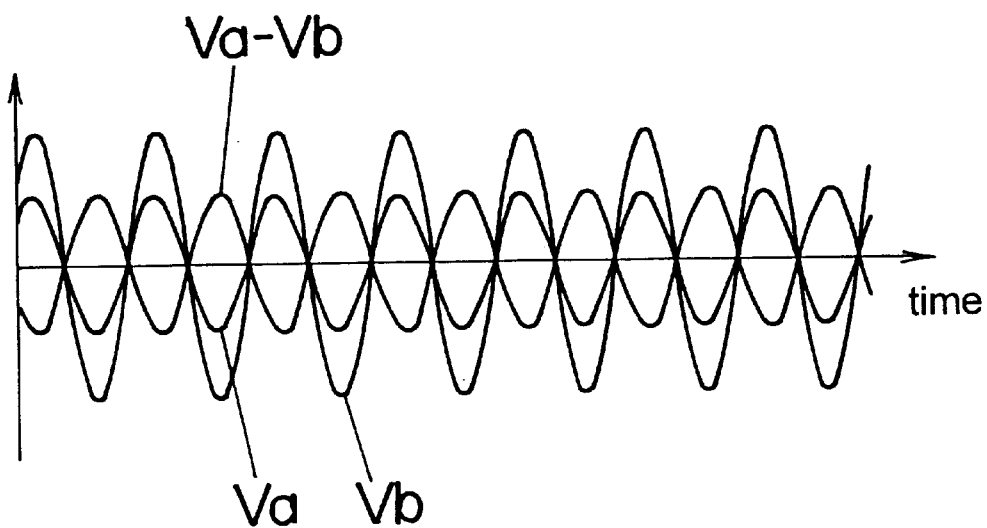
Figure 6:
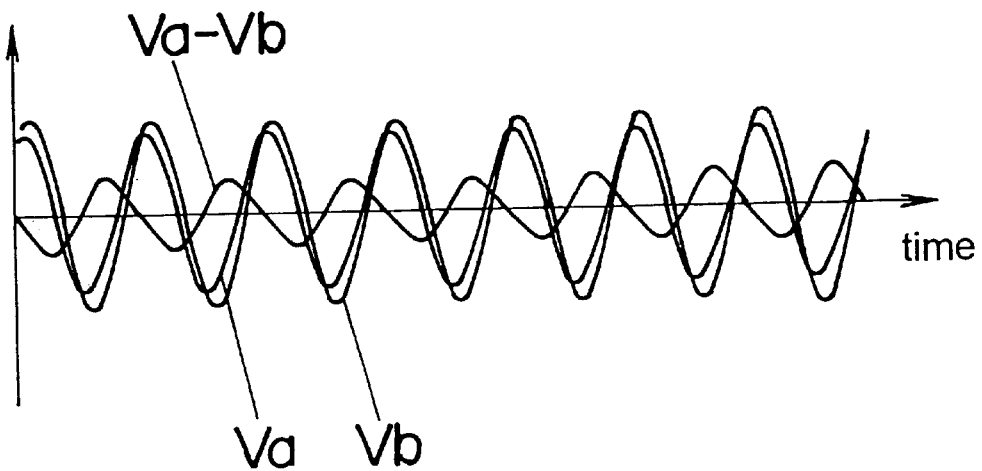
Figure 7:
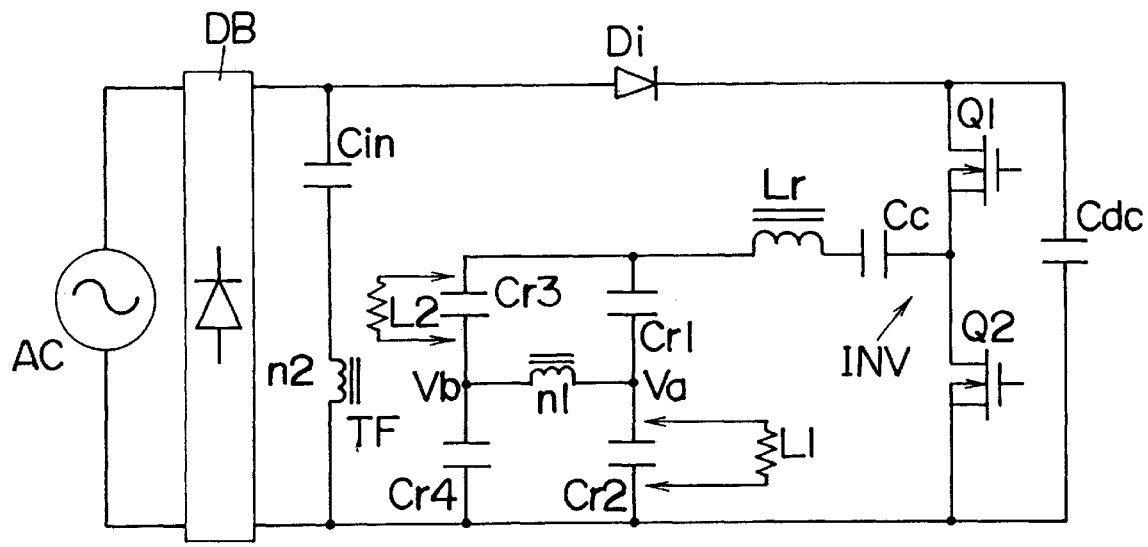
Figure 8:
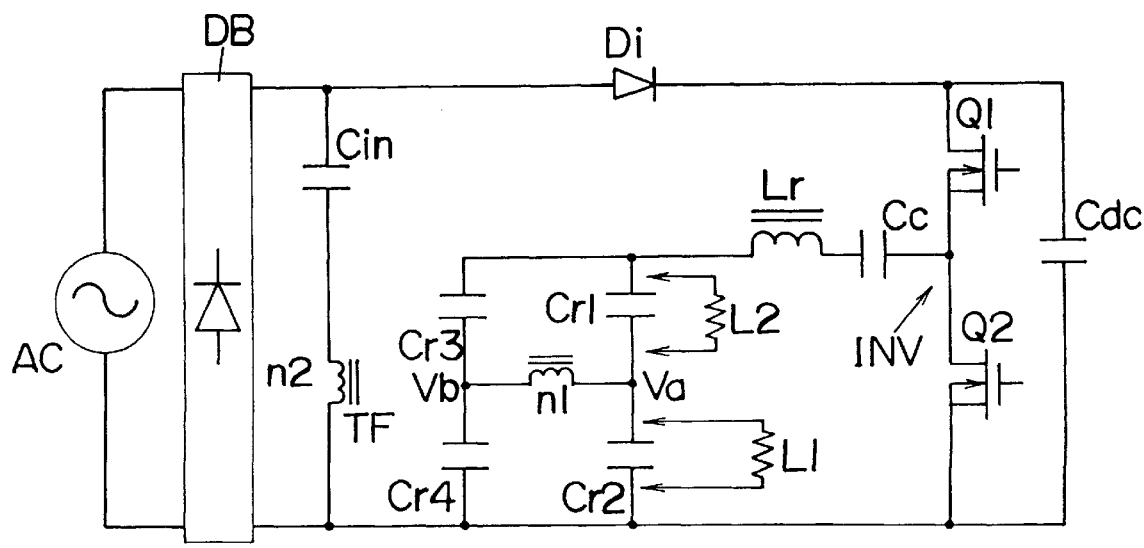
Figure 9:
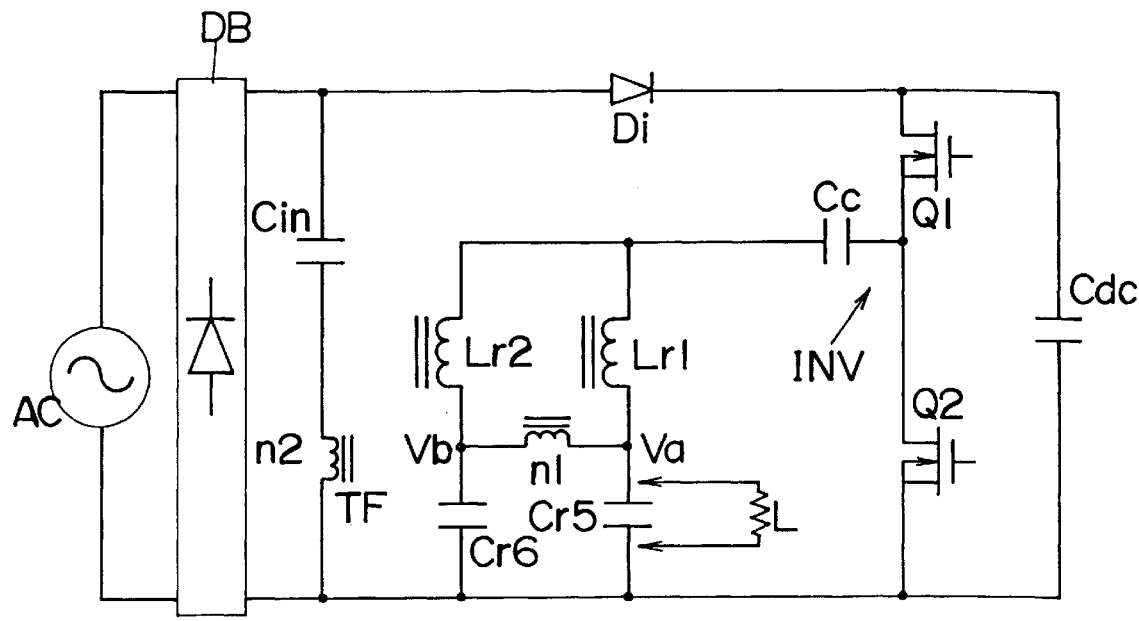
Figure 10:
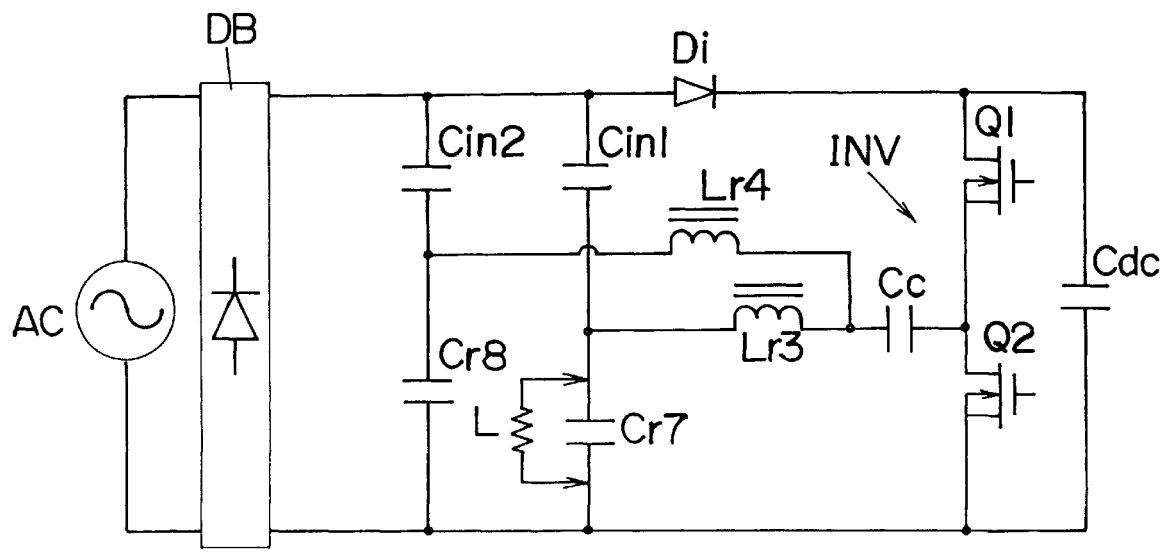
Figure 13A:
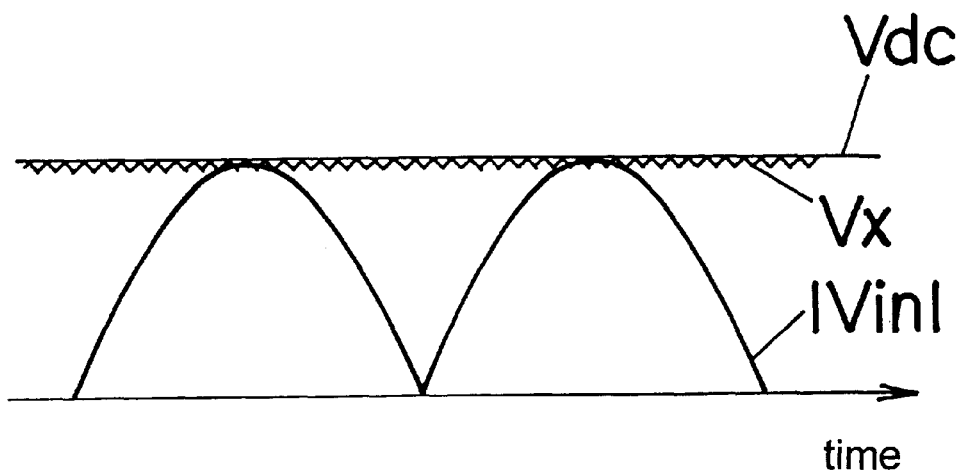
Figure 13B:
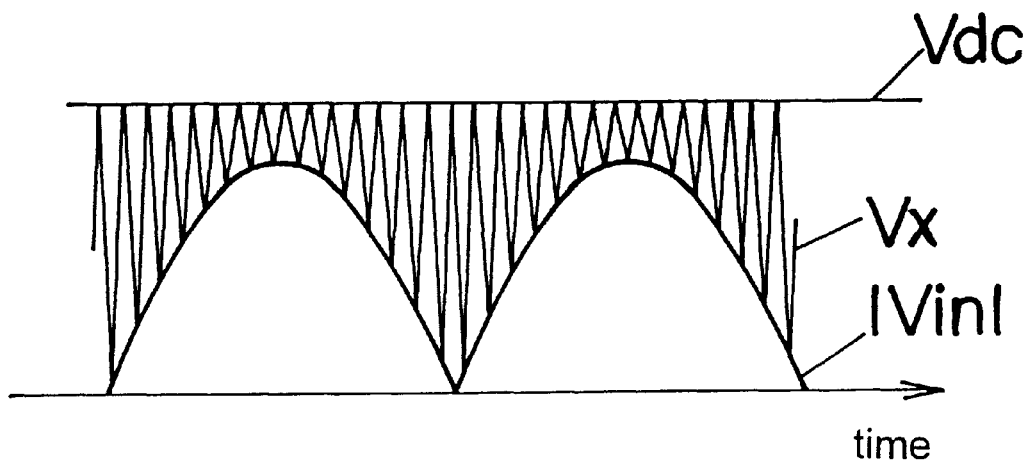
Figure 14:
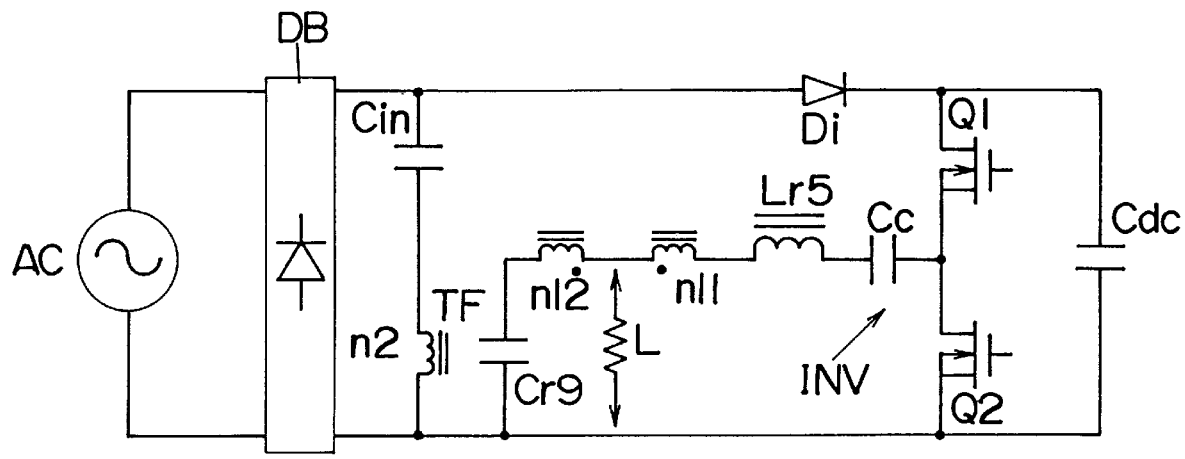
Figure 15:
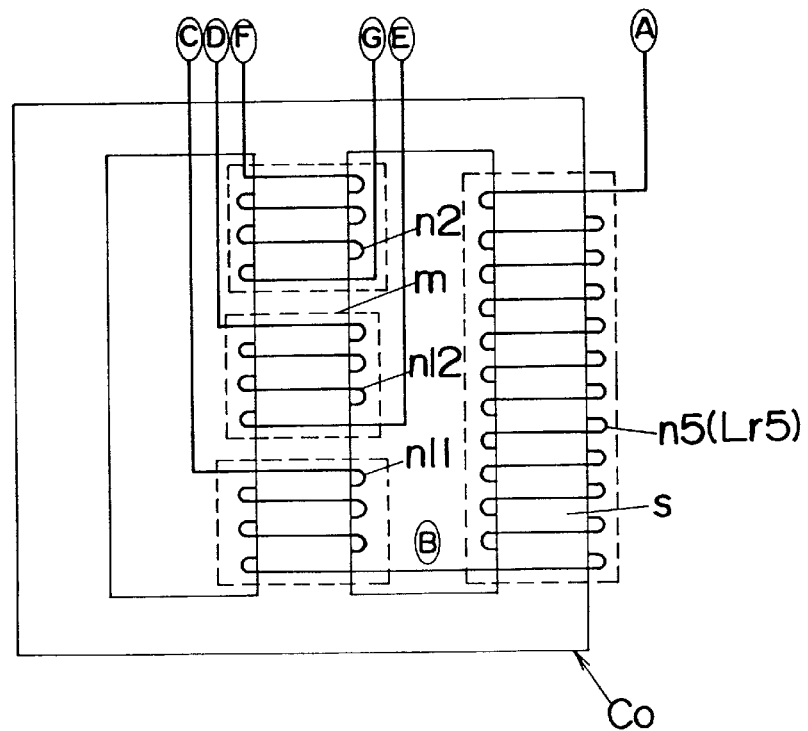
Figure 16:
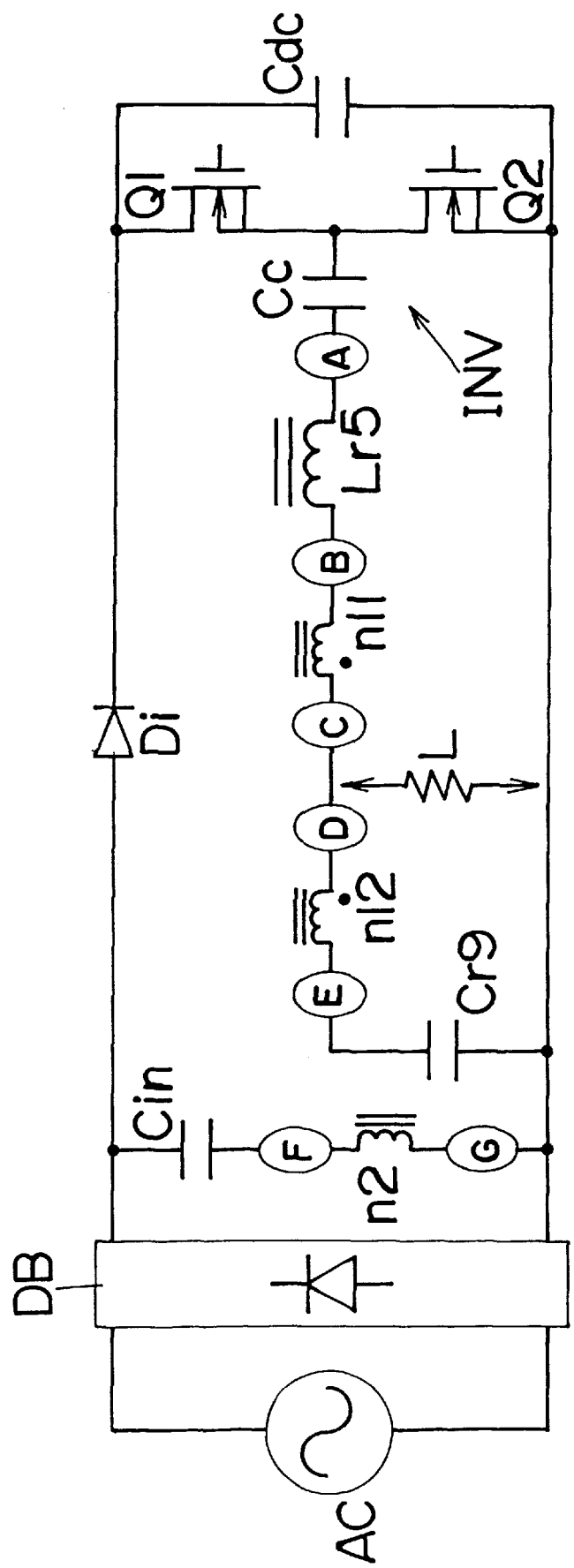
Figure 17:
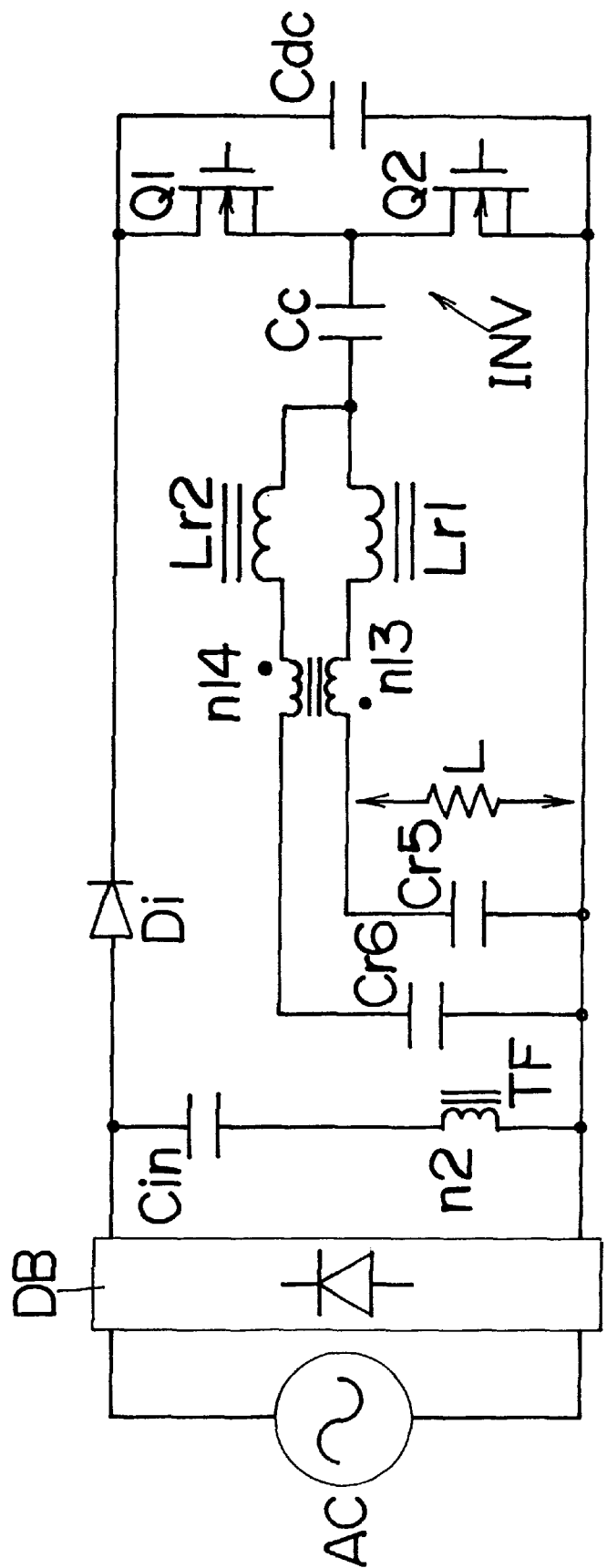
Figure 18:
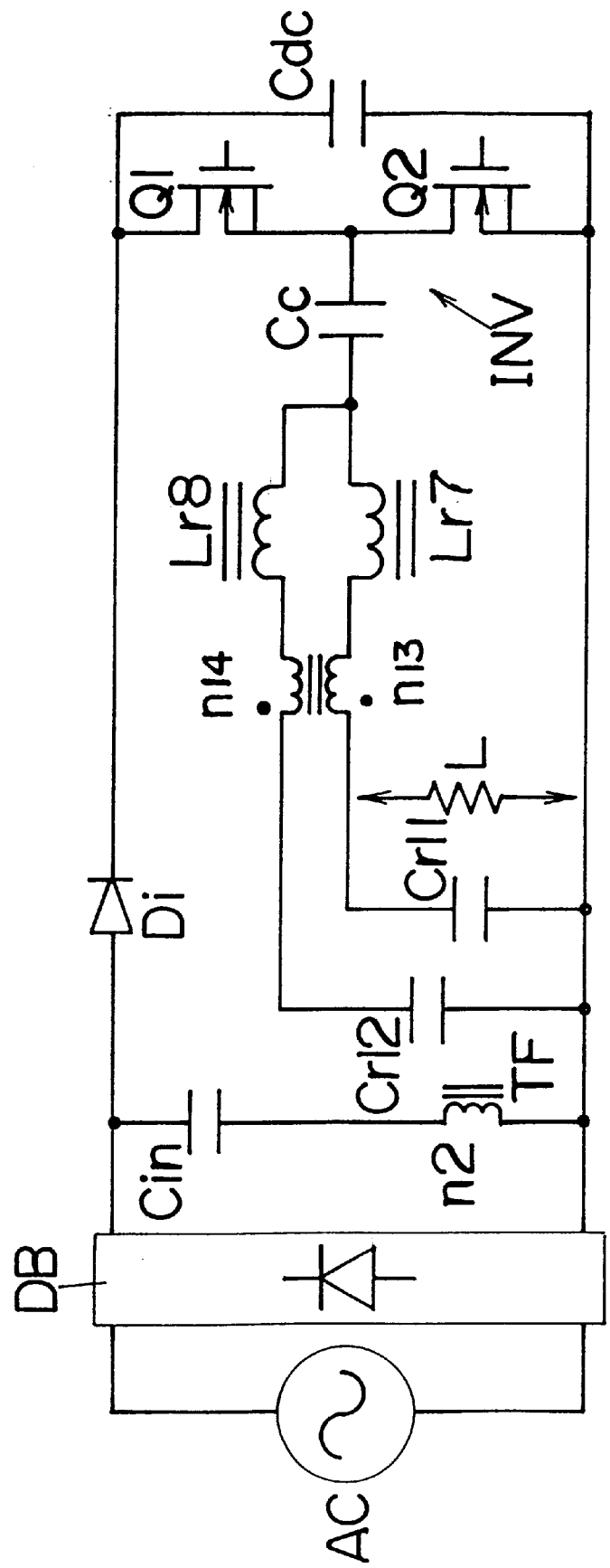
Figure 19:
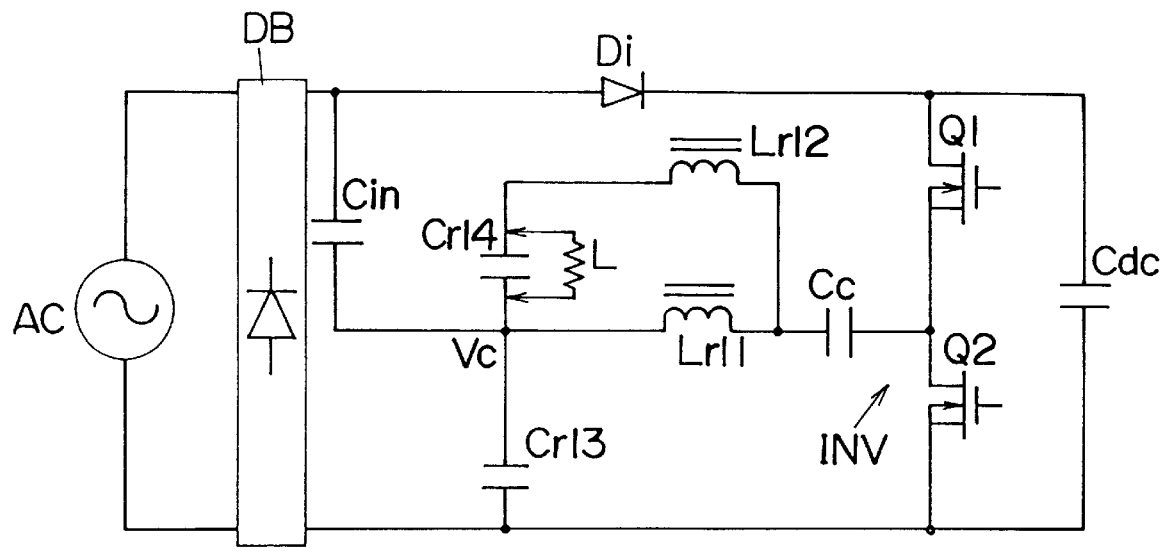
Figure 20:
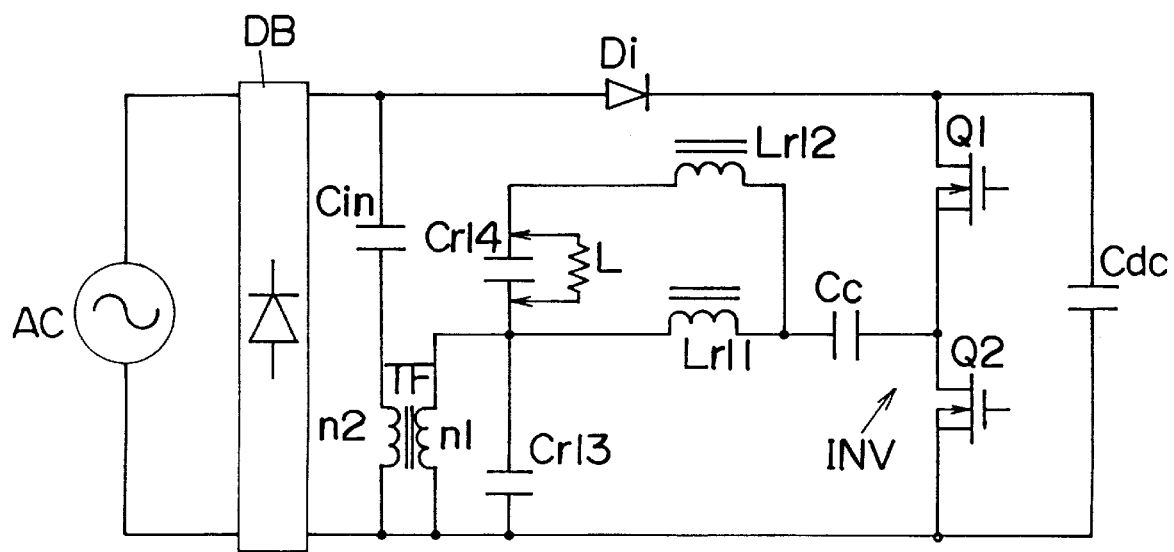
Figure 21:
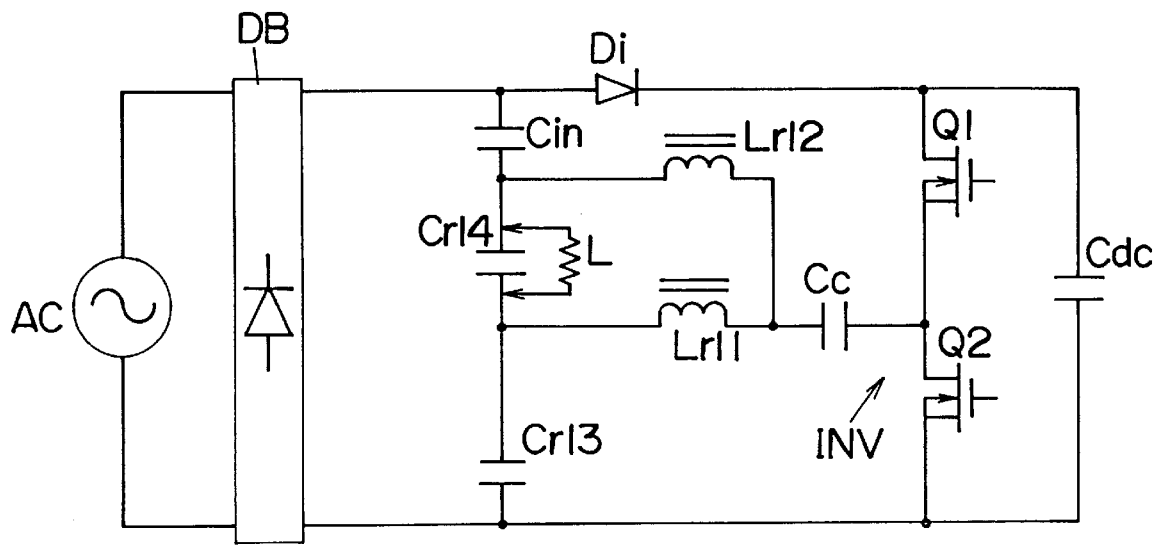
Figure 22:
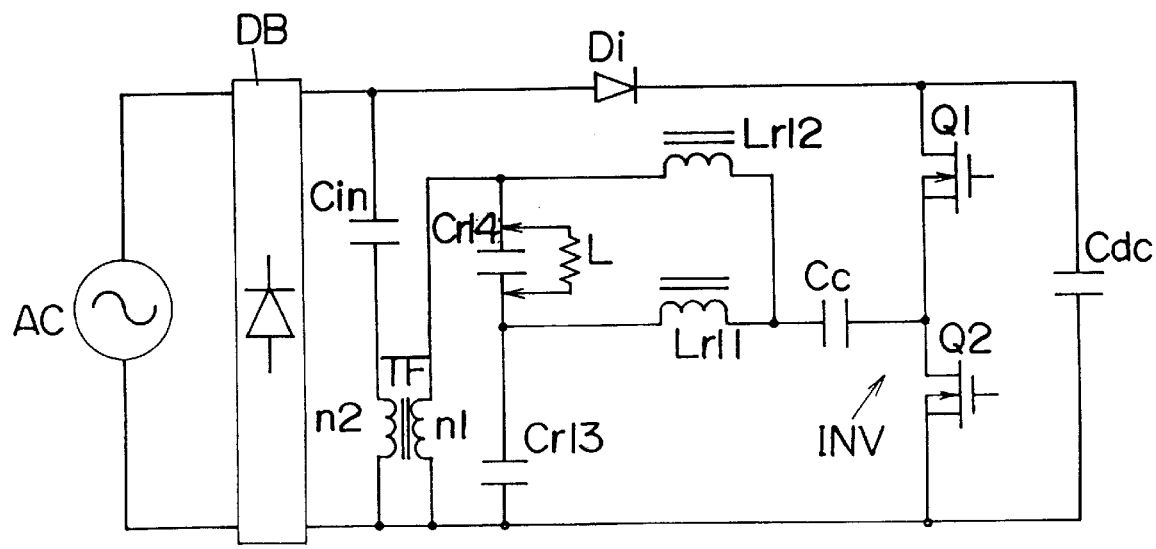
Figure 23:
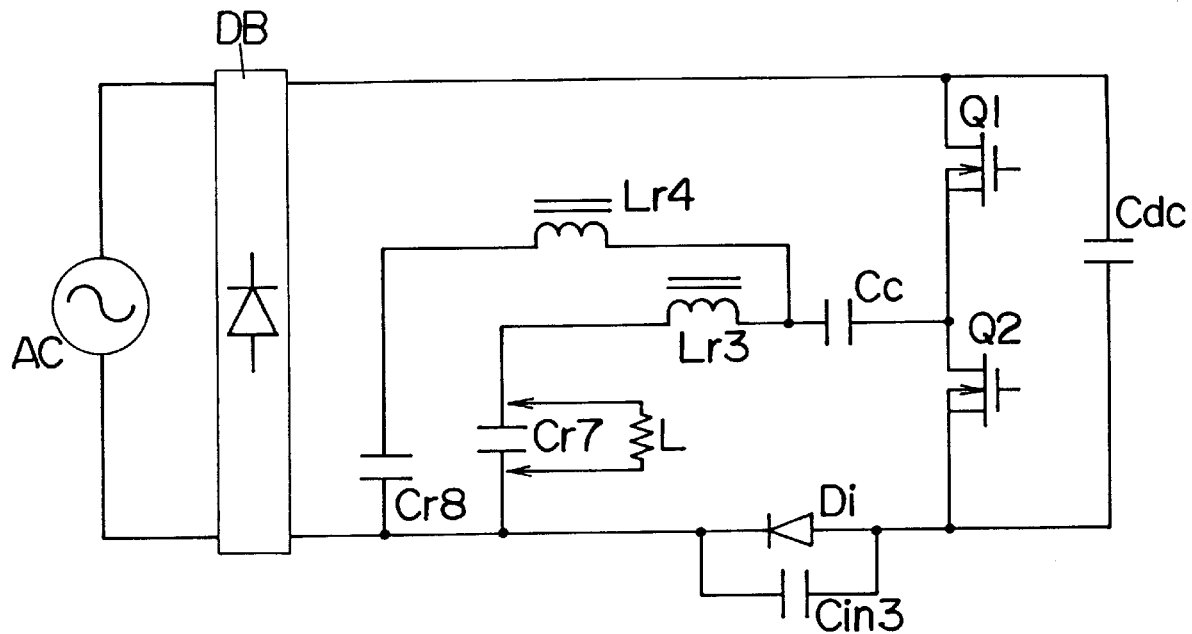
Figure 24:
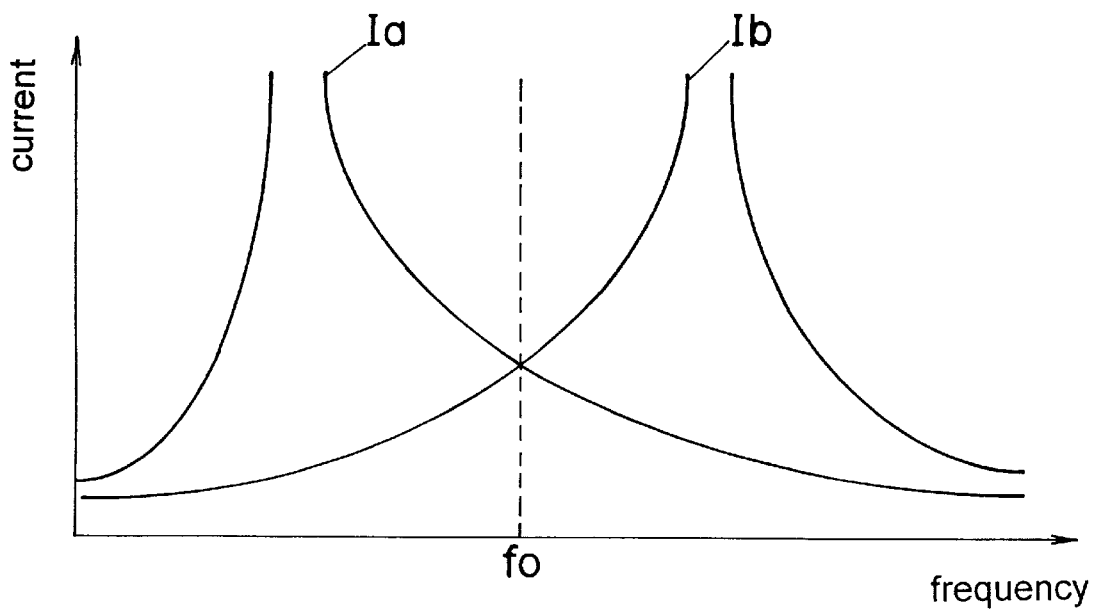
Figure 27:
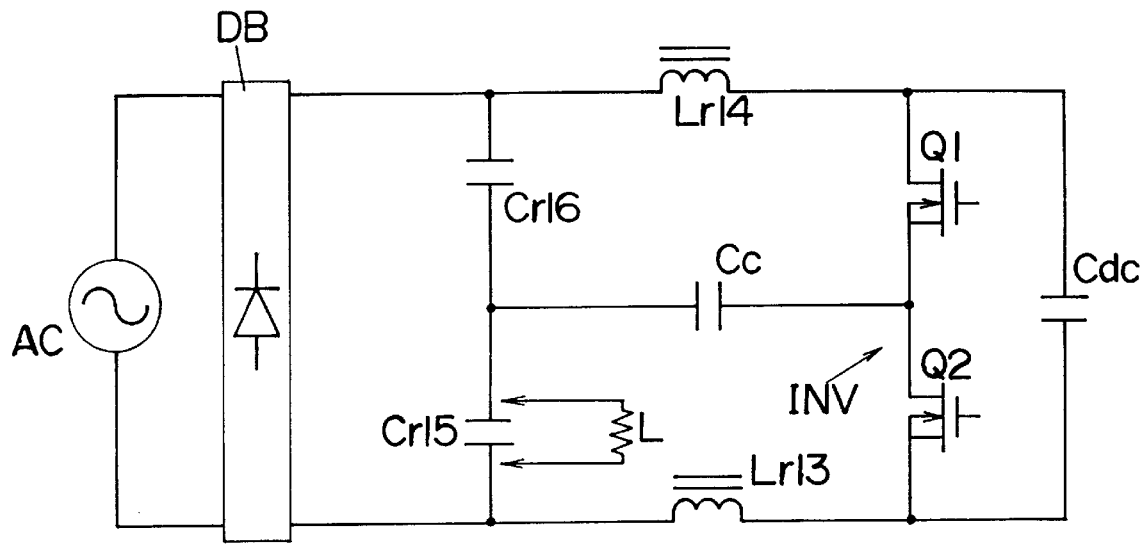
Figure 28:
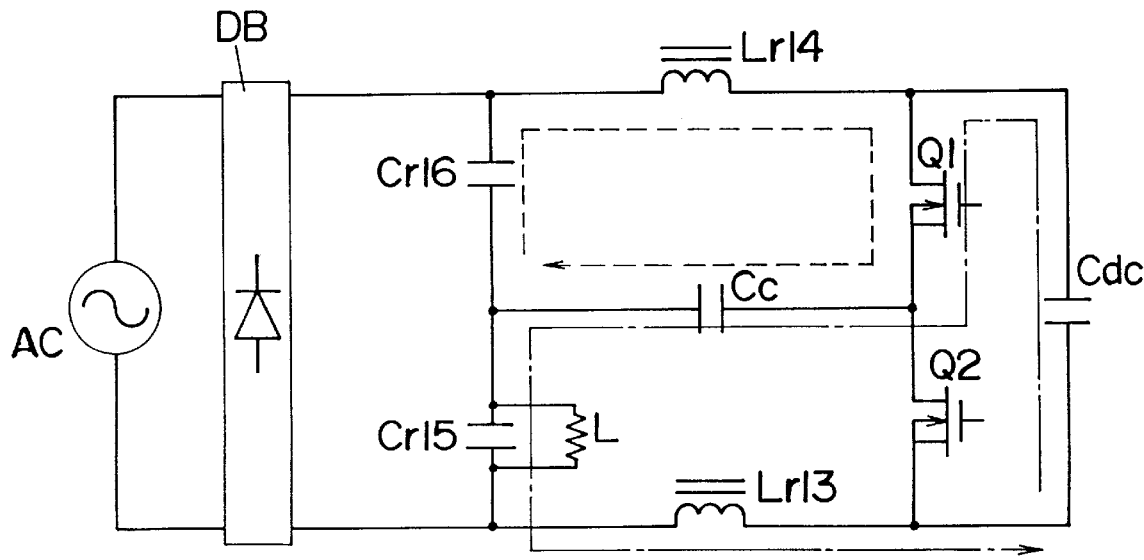
Figure 29:
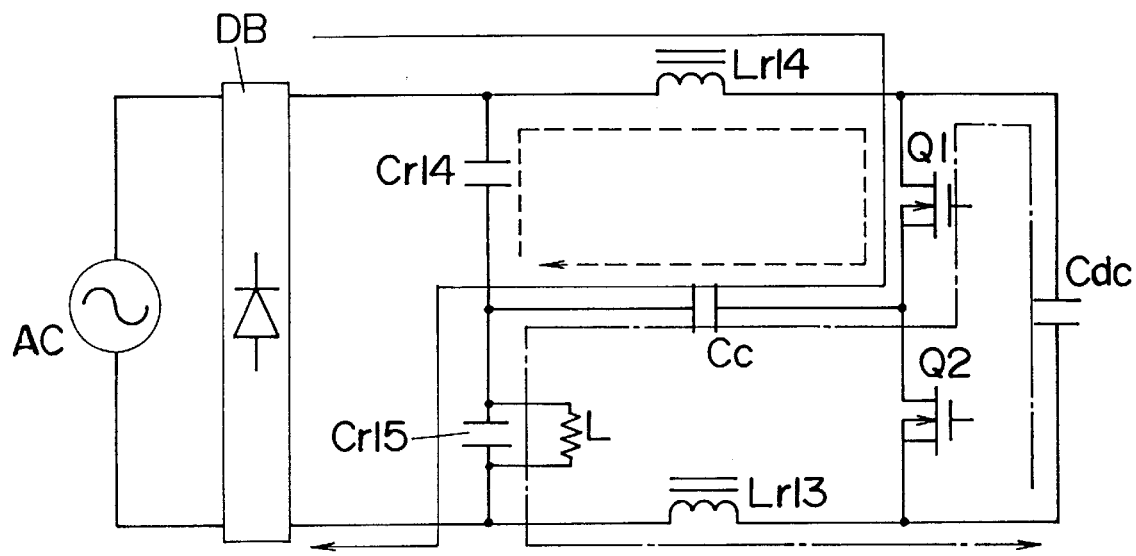
Figure 30:
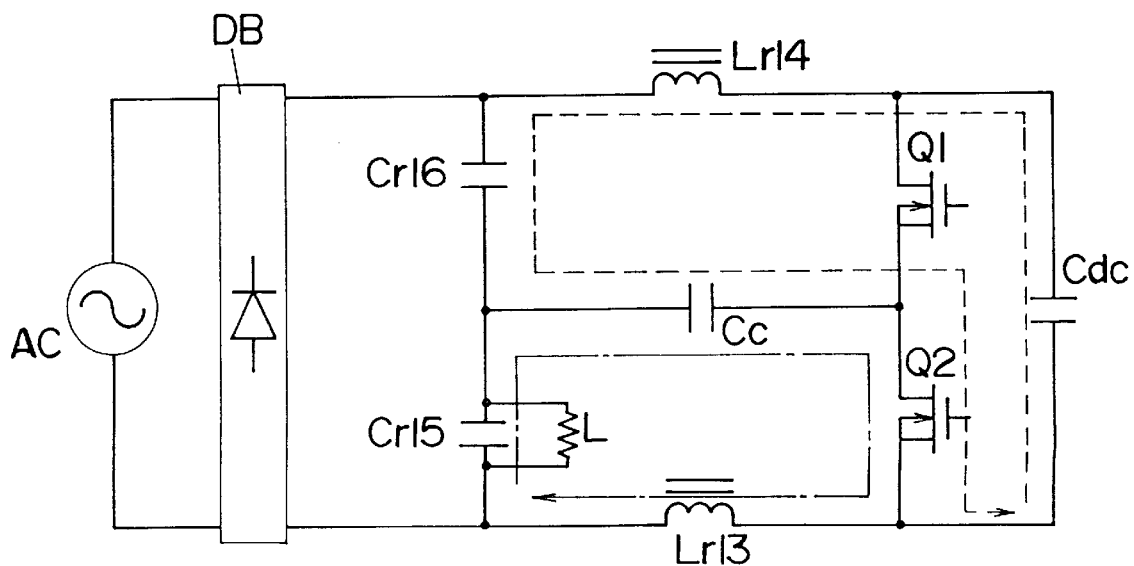
Figure 31:
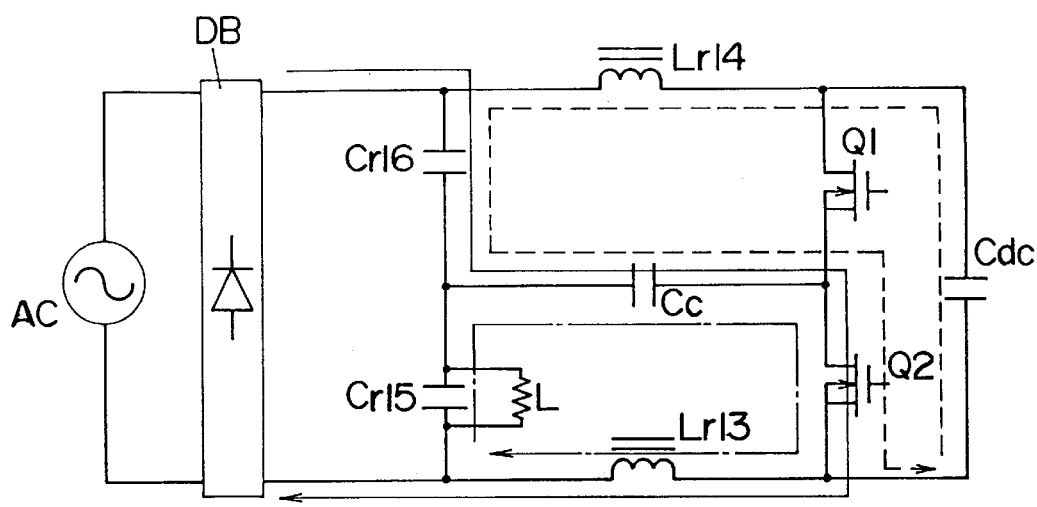
Figure 32A:
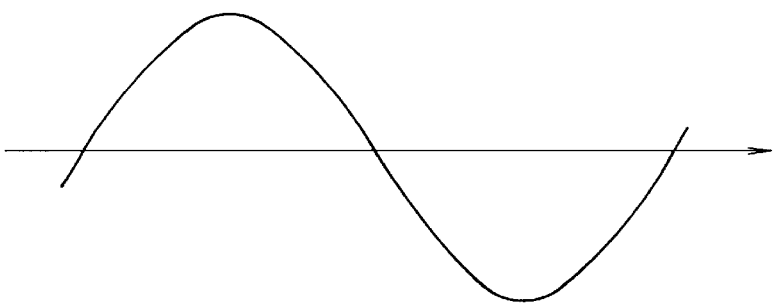
Figure 32B:
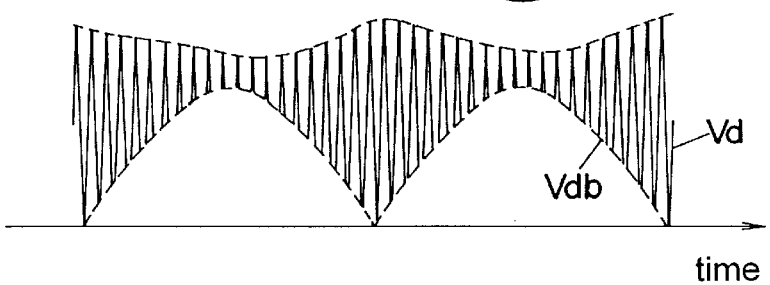
Figure 32C:
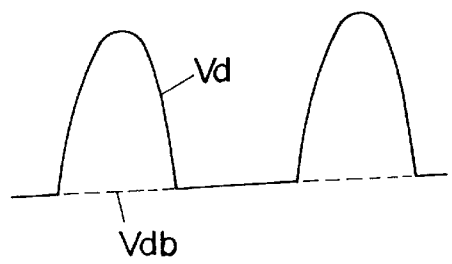
Figure 33:
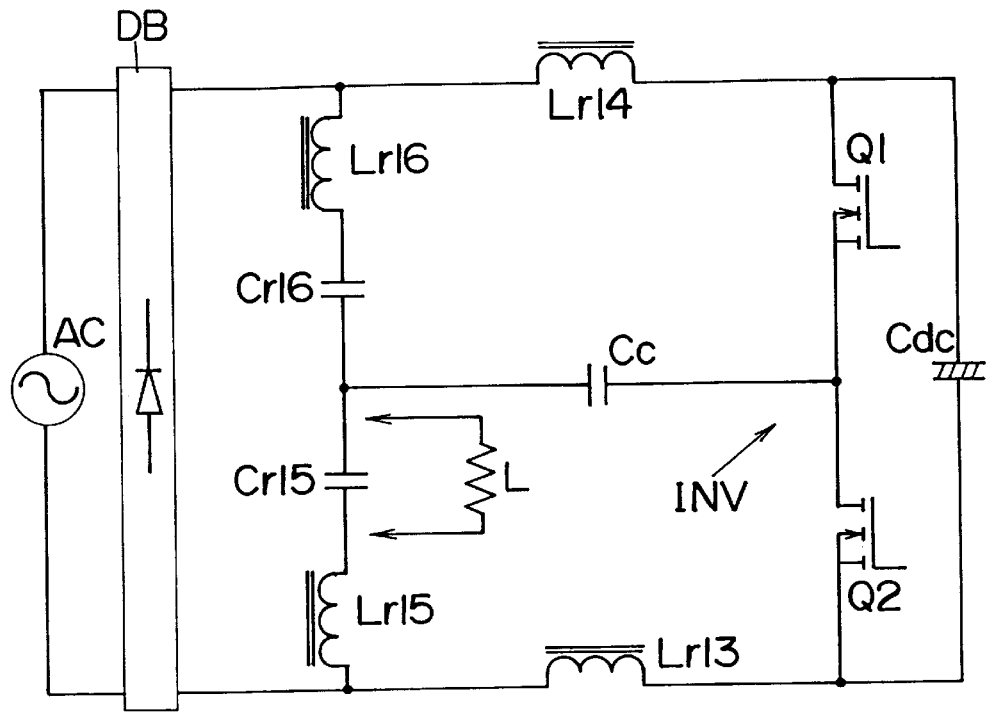
Figure 34:
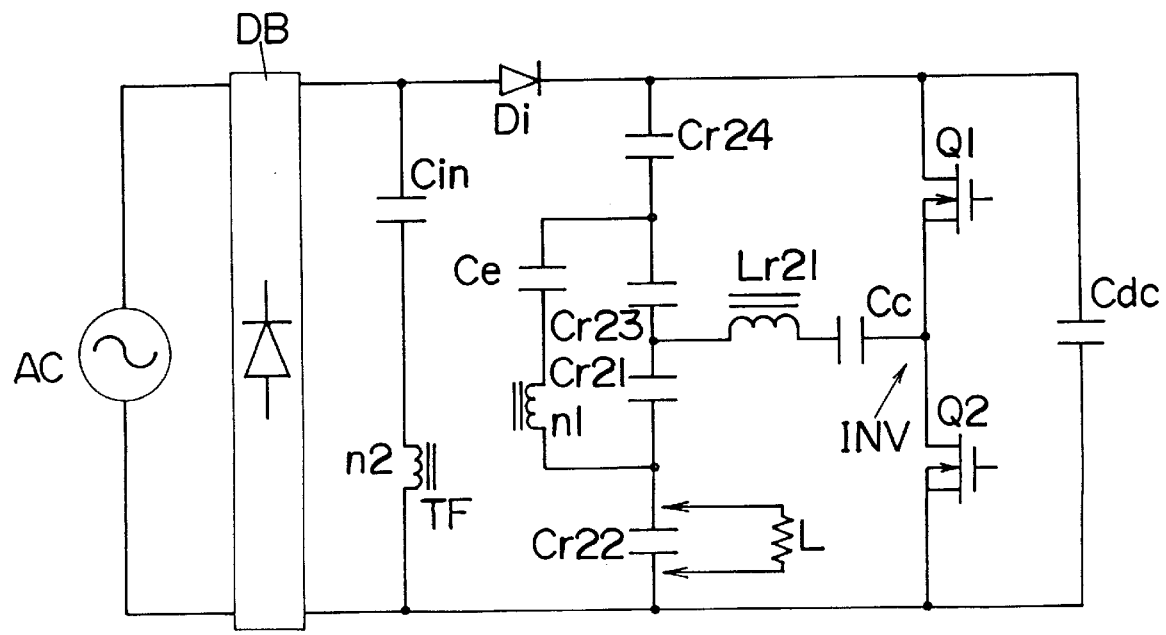
Figure 37:
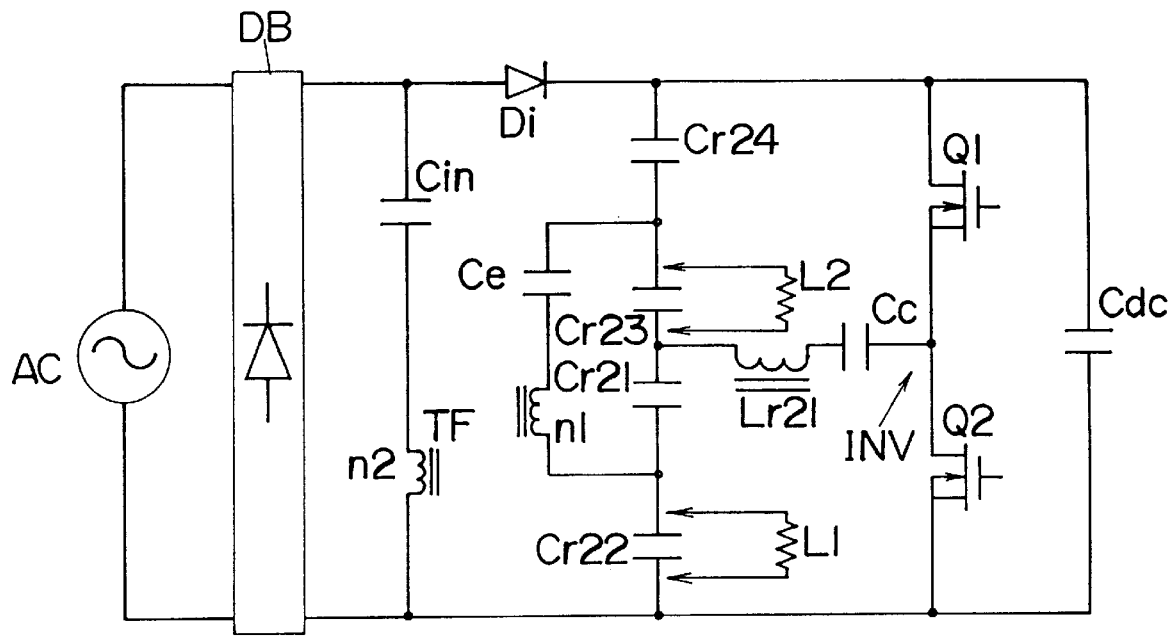
Figure 38:
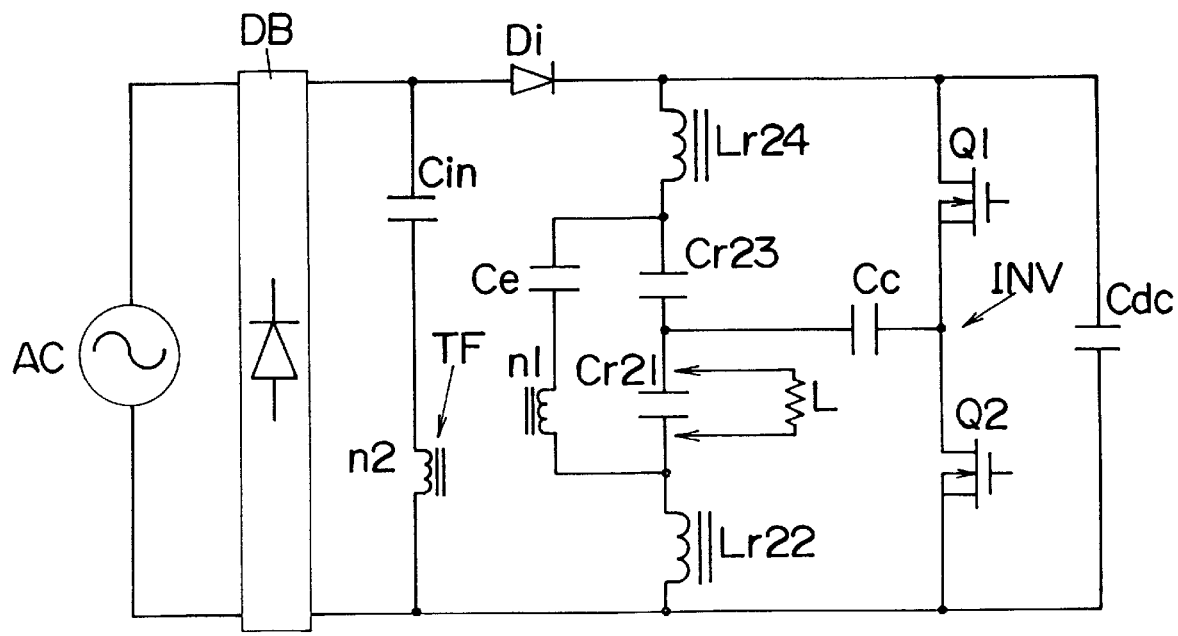
Figure 39:
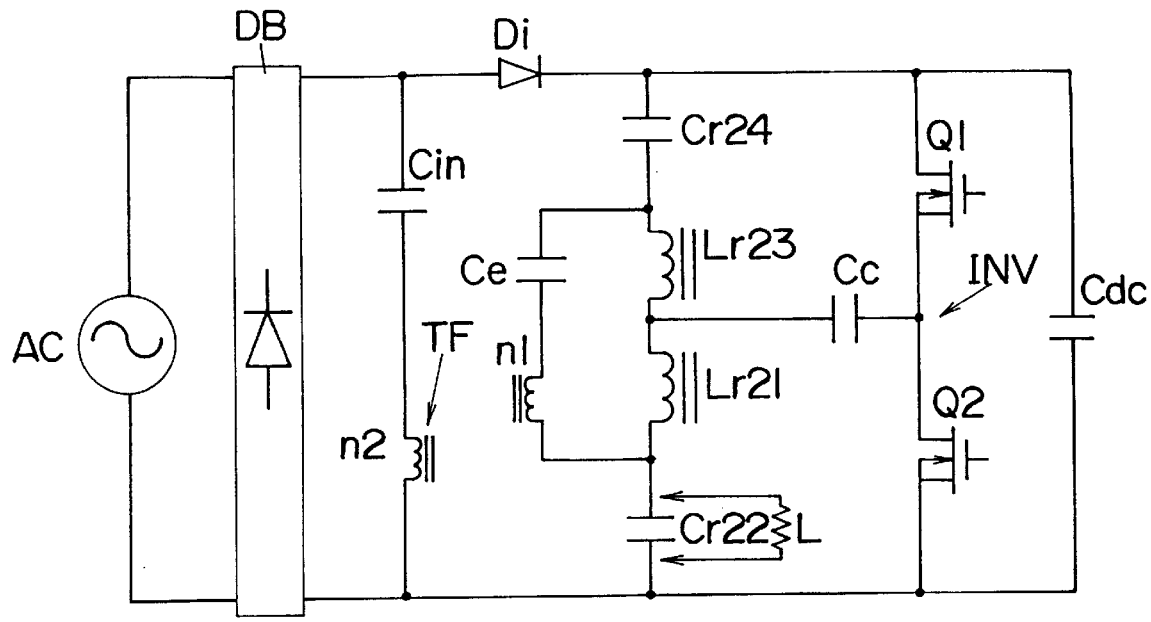
Figure 40:
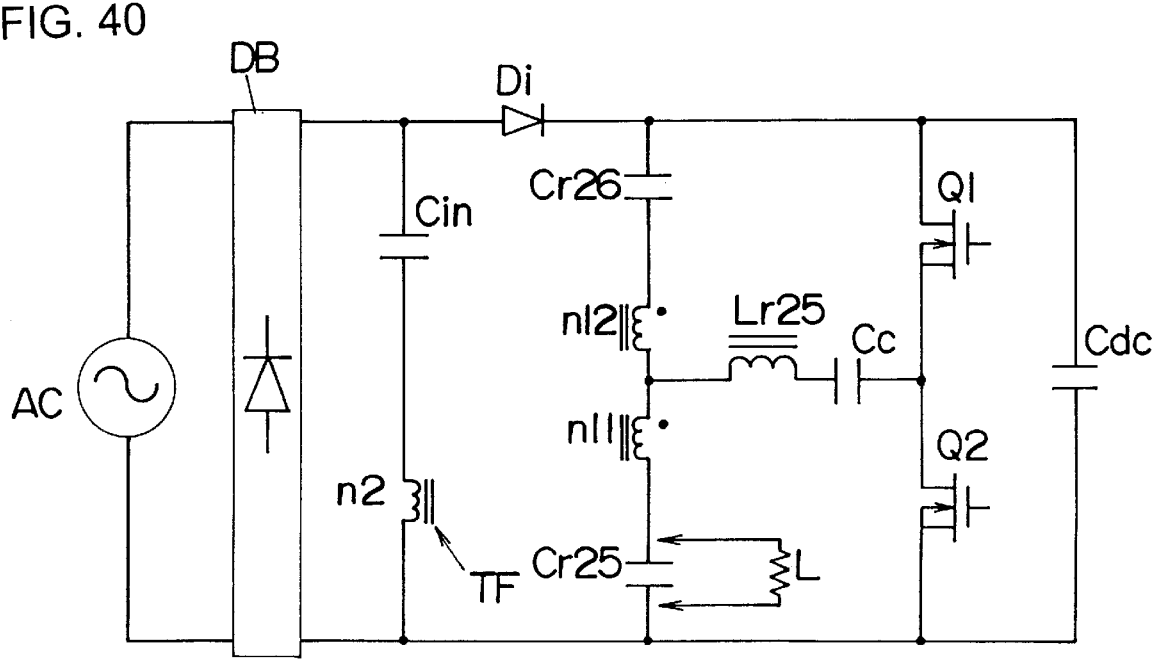
Figure 41:
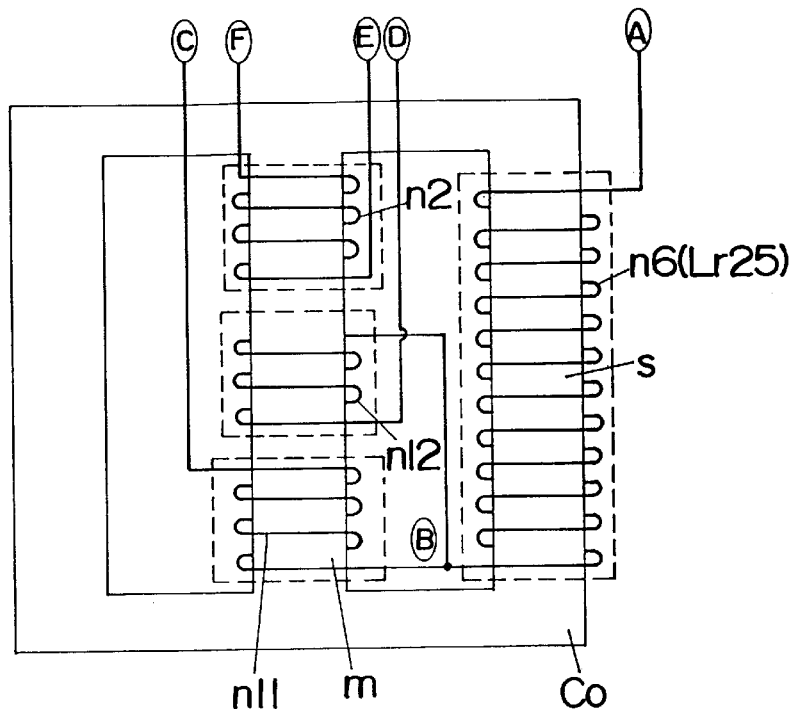
Figure 42:
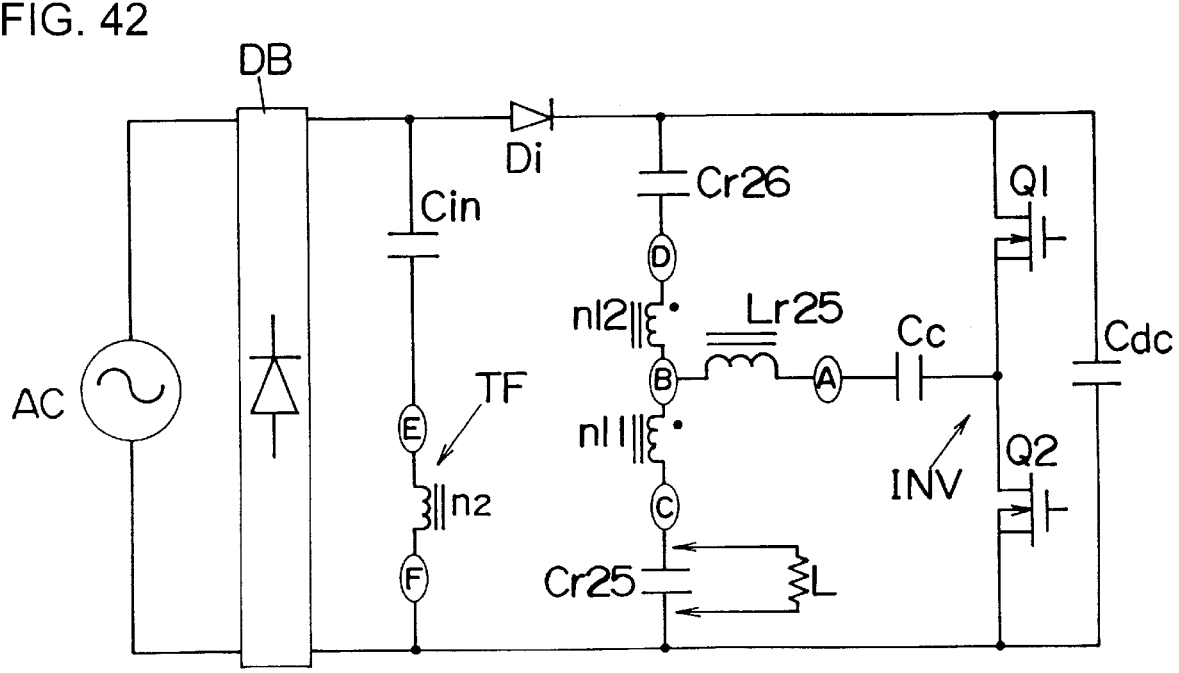
Figure 43:
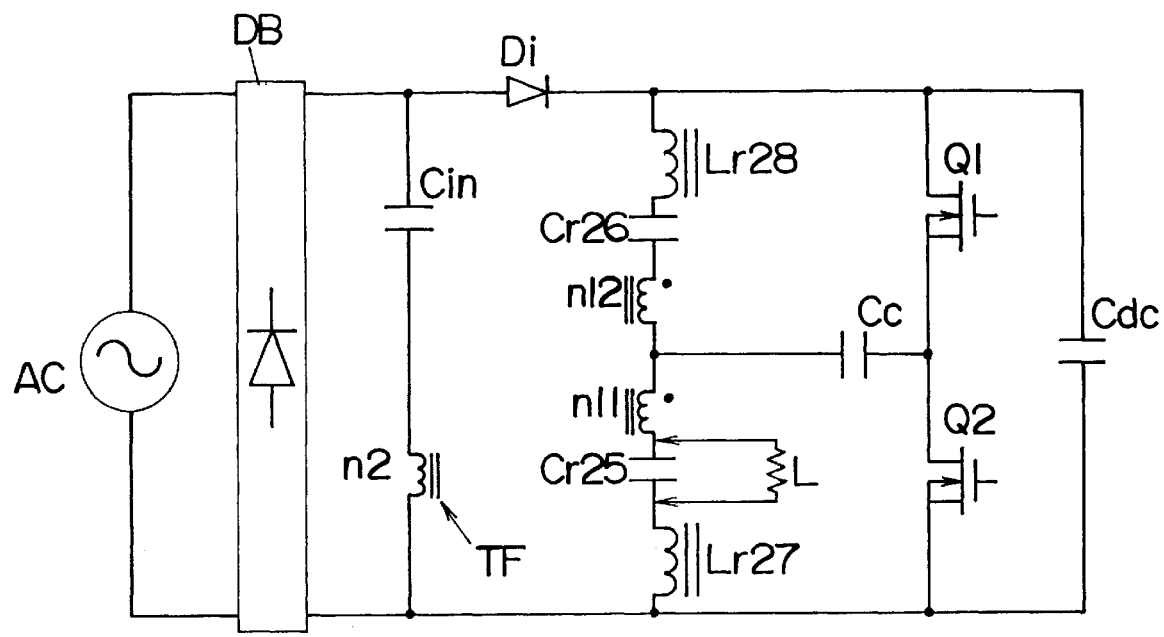
Figure 44:
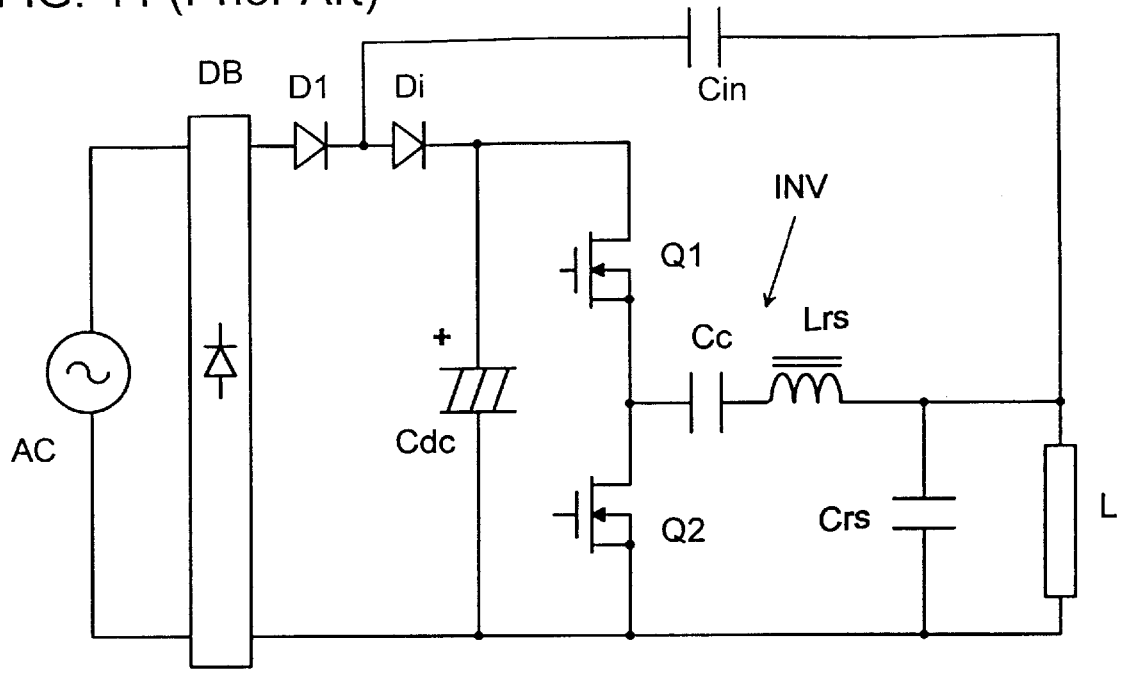

FIGS. 3(a), 3(b), and 3(c) are operational views of the above embodiment under no-load condition;

FIG. 4 is another operational view of the above embodiment under no-load condition;

FIG. 5 is an operational view of the above embodiment under load-connected condition;

FIG. 6 is another operational view of the above embodiment under load-connected condition;

FIG. 7 is a circuit diagram illustrating an example of driving plural load in the above embodiment;

FIG. 8 is another circuit diagram illustrating another example of driving plural loads in the above embodiment;

FIG. 9 is a circuit diagram in accordance with a second embodiment of the present invention;

FIG. 10 is a circuit diagram in accordance with a third embodiment of the present invention;

FIGS. 11(a), 11(b), and 11(c) are operational views of the above embodiment under no-load condition;

FIGS. 12(a), 12(b), and 12(c) are other operational views of the above embodiment under no-load condition;

FIG. 13(a) is a further operational view of the above embodiment under no-load condition;

FIG. 13(b) is an operational view of the above embodiment under load-connected condition;

FIG. 14 is a circuit diagram in accordance with a fourth embodiment of the present invention;

FIG. 15 is a schematic view illustrating configurations of an inductor and a feedback transformer utilized in the above embodiment;

FIG. 16 is a circuit diagram illustrating a wiring connection of the components of FIG. 15;

FIG. 17 is a circuit diagram in accordance with a fifth embodiment of the present invention;

FIG. 18 is a circuit diagram in accordance with a sixth embodiment of the present invention;

FIG. 19 is a circuit diagram in accordance with a seventh embodiment of the present invention;

FIG. 20 is a circuit diagram of a modification of the above embodiment;

FIG. 21 is a circuit diagram in accordance with an eighth embodiment of is the present invention;

FIG. 22 is a circuit diagram of a modification of the above embodiment;

FIG. 23 is a circuit diagram in accordance with a ninth embodiment of the present invention;

FIG. 24 is an explanatory view illustrating an example of setting a switching frequency;

FIG. 25 (a), 25(b), and 25(c) are operational views of the above embodiment under no-load condition;

FIG. 26 is another operational view of the above embodiment under no-load condition;

FIG. 27 is a circuit diagram in accordance with a tenth embodiment of the present invention;

FIG. 28 is an operational view of the above embodiment;

FIG. 29 is another operational view of the above embodiment;

FIG. 30 is a further operational view of the above embodiment;

FIG. 31 is a still further operational view of the above embodiment;

FIGS. 32(a), 32(b), and 32(c) are further operational views of the above embodiment;

FIG. 33 is a circuit diagram of a modification of the above embodiment;

FIG. 34 is a circuit diagram in accordance with an eleventh embodiment of the present invention;

FIGS. 35(a), 35(b), and 35(c) are operational views of the above embodiment under no-load condition;

FIG. 36 is a circuit diagram illustrating an example of driving plural loads in the above embodiment;

FIG. 37 is a circuit diagram illustrating another example of driving plural loads in the above embodiment;

FIG. 38 is a circuit diagram in accordance with a twelfth embodiment of the present invention;

FIG. 39 is a circuit diagram of a modification of the above embodiment;

FIG. 40 is a circuit diagram in accordance with a thirteenth embodiment of the present invention;

FIG. 41 is a schematic view illustrating configurations of an inductor and a feedback transformer utilized in the above embodiment;

FIG. 42 is a circuit diagram illustrating a wiring connection of the components of FIG. 41;

FIG. 43 is a circuit diagram in accordance with a fourteenth embodiment of the present invention;

FIG. 44 is a circuit diagram of a prior art; and

Figure 45:
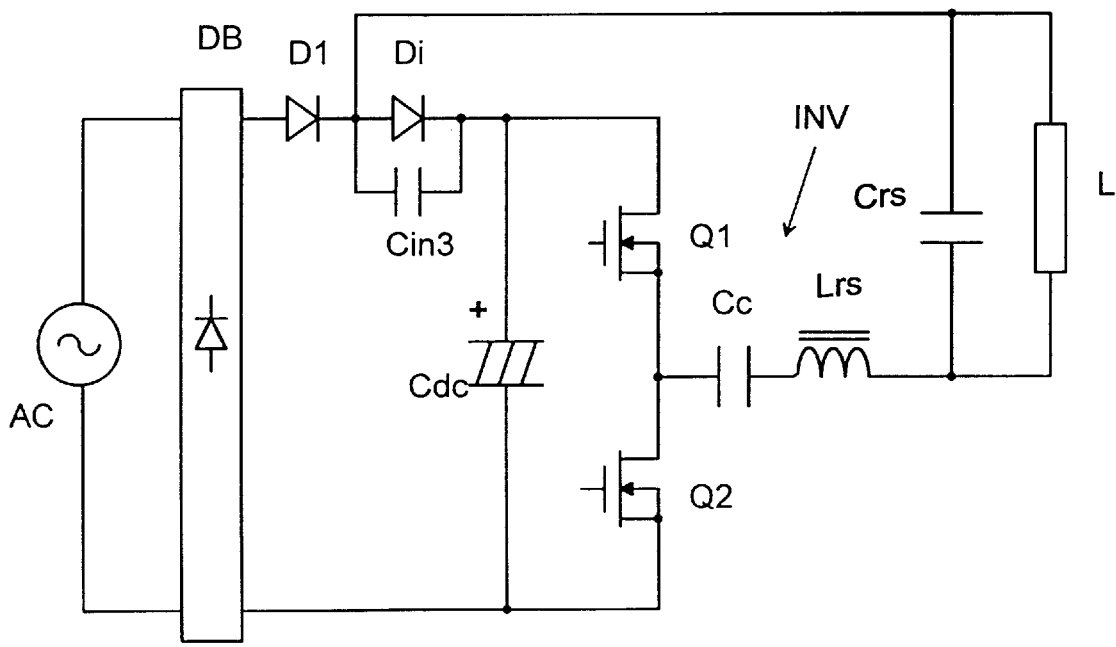

FIG. 45 is a circuit diagram of another prior art.

DETAILED DESCRIPTION OF THE EMBODIMENTS

First Embodiment

Figure 1:
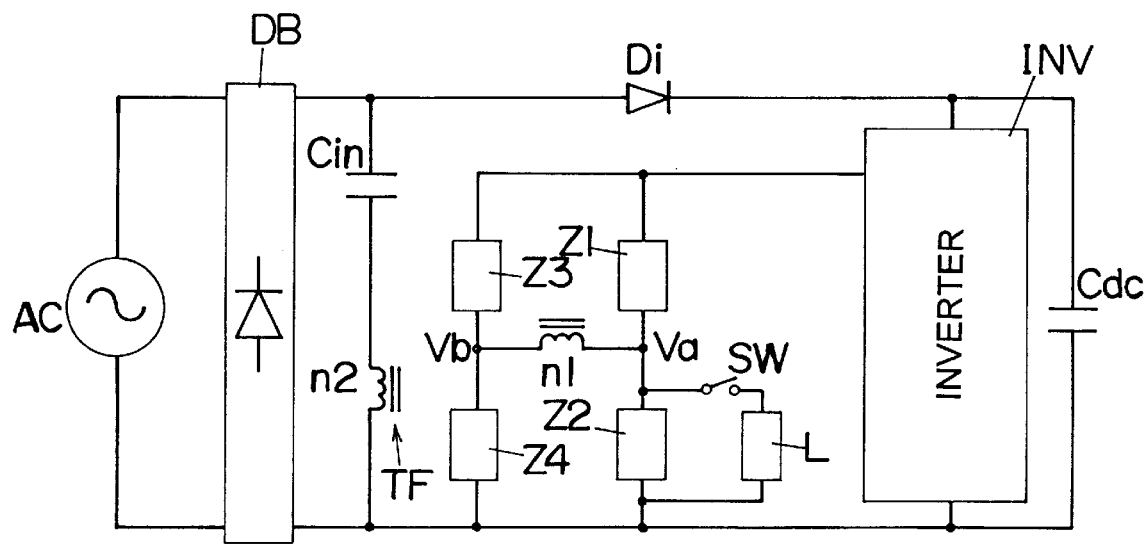
FIG. 1 is a schematic view illustrating a basic configuration of a first embodiment of the present invention.

A power supply device in accordance with first embodiment of the present invention has a basic circuit configuration as shown in FIG. 1. The device comprises a rectifier DB for full-wave rectification of an AC voltage from a voltage source AC such as a commercial voltage source and a smoothing capacitor Cdc connected across DC output ends of rectifier DB through a diode Di. Rectifier DB is provided in the form of a diode-bridge. Capacitor Cdc acts as a voltage source for an inverter INV which applies a high frequency voltage to a load circuit. The load circuit includes a load L and a resonant circuit which includes at least two resonant systems. The resonant circuit has various configurations as discussed later but is basically configured to include a bridge circuit composed of four impedance elements Z1 to Z4 as shown in FIG. 1. The bridge circuit of impedance elements Z1 to Z4 is connected to the output of the inverter INV. The load L is connected in parallel with one of impedance elements Z1 to Z4. In FIG. 1, a switch SW is included to show symbolically a load-connected condition where the load L is driven to operate and a no-load condition where the load is disconnected or no current flows even in the load-connected condition. The load-connected condition and no-load condition can be shown respectively by switch SW being turned on and off.

A feedback transformer TF is connected in circuit to insert its primary winding n1 between two connections of impedance elements Z1 to Z4, the connections being defined in respective arms of the bridge (one arm formed by a series circuit of Z1 and Z2, and the other by a series circuit of Z3 and Z4). A secondary winding n2 of feedback transformer TF is connected in series with a distortion improving capacitor Cin to form a series circuit which is connected across DC output ends of rectifier DB.

It is assumed that a high frequency induced voltage will develop across the secondary winding n2 of feedback transformer TF in the circuit of FIG. 1. In view of that a voltage across the series circuit of capacitor Cin and secondary winding n2 is equal to the voltage across the DC output ends of rectifier DB, voltage across capacitor Cin becomes larger as a peak-value of induced voltage at secondary winding n2 is made greater during a period in which the upper end of the secondary winding as viewed in FIG. 1 becomes to have negative polarity, and voltage across capacitor Cin becomes smaller as the peak-value of induced voltage at secondary winding n2 is made smaller during a period where the upper end of the secondary winding as viewed in FIG. 1 becomes to have positive polarity. In other words, two conditions repeats alternately to each other, one for flowing a current from the AC voltage source (rectifier DB) to charge capacitor Cin, and the other for discharging capacitor Cin through diode Di to charge capacitor Cdc in response to varying voltage induced at the secondary winding n2.

In the circuit of FIG. 1, secondary winding n2 of feedback transformer TF will provide the induced voltage based upon the output of the inverter INV, therefore the input current is fed from the AC voltage source at a frequency corresponding to a high frequency output of the inverter INV. That is, by setting the inverter INV to have the output frequency which is sufficiently higher than that of the AC voltage source, the input current will be fed from the AC voltage source at such high frequency. With this consequence, it is made to feed the input current continuously from the AC voltage source simply by inserting a high frequency blocking filter of small configuration between the AC voltage source and capacitor Cin, thereby restraining an increase in the input current distortion. Because of that the input current is proportional to the difference between the induced voltage at secondary winding n2 of feedback transformer TF and the output of rectifier DB and also because of that amplitude of the induced voltage at secondary winding n2 is kept constant during the load-connected condition, the input current can be proportional to an instantaneous voltage of the AC voltage source, eventually increasing the input power factor.

When the voltage across the secondary winding n2 increases through the above operation to such an extent that the sum of the voltage across the secondary winding n2 and the voltage across capacitor Cin reaches the voltage across capacitor Cdc, the charge accumulated in capacitor Cin is discharged through diode Di to capacitor Cdc. Whereby, an energy necessary to be fed to the load is accumulated in capacitor Cdc. In the no-load condition as shown in FIG. 1 with switch SW being turned off, the load L connected to the output of the inverter consumes no electric power. If the input current is fed continuously from the AC voltage source in this condition, the input energy becomes excessive relative to the output energy so that excessive energy would be utilized for increasing the voltage across capacitor Cdc to an unduly high level. Accordingly, it is required to limit a voltage increase at capacitor Cdc in order to reduce energy difference between the input and the output and therefore to leave no additional energy during the no-load condition.

As apparent from the above-explained operations, the voltage across capacitor Cdc is a function of the absolute induced voltage (voltage amplitude) at the secondary winding n2 of feedback transformer TF. Taking this into consideration, the voltage increase at capacitor Cdc can be limited by reducing amplitude of the induced voltage at the secondary winding n2 in the no-load condition. Further, in view of that the increase in the input current distortion can be avoided by increasing the amplitude of the induced voltage at the secondary winding n2, it is necessary to increase the amplitude of the induced voltage at the secondary winding n2 in the load-connected condition. In this consequence, it is made to increase the voltage across the primary winding n1 in the load-connected condition and to decrease that voltage in the no-load condition. To this end, the present embodiment is configured to differentiate at least one of amplitude and phase of the high frequency voltage Va relative to that of the high frequency voltage Vb in the load-connected condition and to equalize the amplitude as well as the phase of the high frequency voltages Va and Vb in the no-load condition.

In detail, the bridge circuit of the four impedance elements Z1 to Z4 is balanced in the no-load condition so as to apply no substantial voltage across the primary winding n1, and is unbalanced in the load-connected condition to apply a desired voltage across the primary winding n1. As is known, the bridge circuit is balanced when $Z1:Z4=Z2:Z3$. Therefore, circuit parameters are selected to satisfy the balancing requirement in the no-load condition for limiting the voltage increase across capacitor Cdc in that condition, which in turn brings about the unbalancing in the load-connected condition (due to variation in Z2 of the illustrated embodiment), thereby avoiding increase in the input current distortion.

Figure 2:
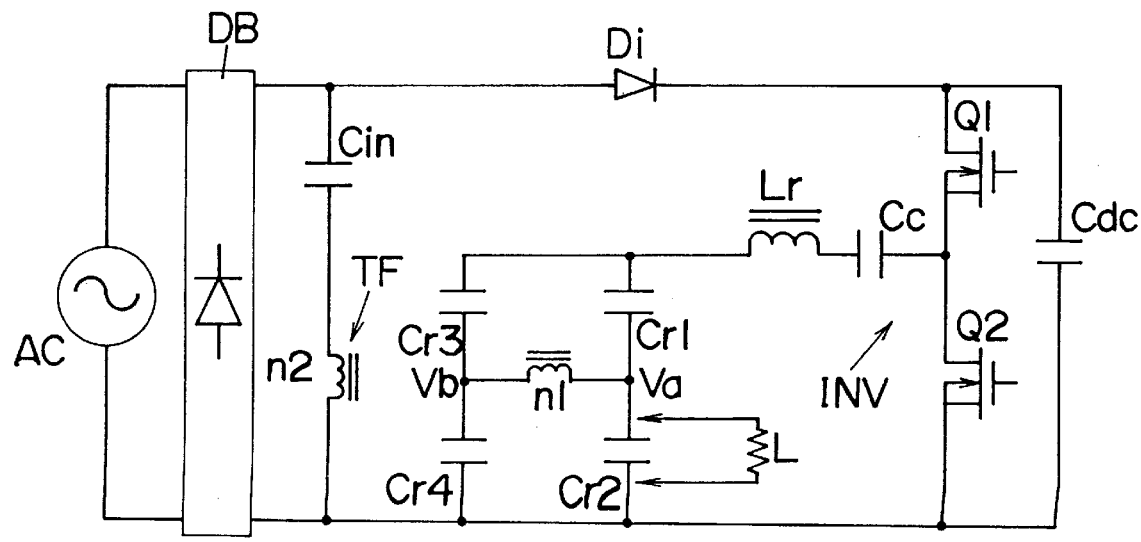
FIG. 2 is a circuit diagram of the above embodiment.

Impedance elements Z1 to Z4 of FIG. 1 can be respectively capacitors Cr1 to Cr4, as shown in FIG. 2. The inverter INV may be of a half-bridge configuration. In the figure, the load L is connected across capacitor Cr2 as indicated by arrowhead which is intended to denote both the load-connected condition and the no-load condition.

In more detail, smoothing capacitor Cdc is connected through diode Di across the DC output ends of rectifier DB which provides the full-wave rectification of the voltage from the AC voltage source, and the secondary winding n2 of feedback transformer TF is connected in series with the distortion improving capacitor Cin also across the DC output ends of rectifier DB. A pair of switching elements Q1 and Q2 is connected in series across capacitor Cdc. Connected across switching elements Q2 (on the negative polarity side of capacitor Cdc) is a series combination of a DC blocking (coupling) capacitor Cc and the resonant circuit which define the inverter INV with the other switching element Q1. MOSFET is utilized for each switching elements Q1 and Q2. The resonant circuit comprises an inductor Lr connected in series with the bridge circuit of capacitors Cr1 to Cr4. The bridge circuit has two arms which are defined respectively by a series combination of Cr1 and Cr2 and that of Cr3 and Cr4. The primary winding n1 of feedback transformer TF is inserted between a connection of Cr1 and Cr2 in one arm and a connection of Cr3 and Cr4 in the other arm. The load L is adapted to be connected across capacitor Cr2. Capacitors Cr1 to Cr4 are balanced in the no-load condition by satisfying a relation that Cr1:Cr4=Cr2:Cr3.

The switching elements Q1 and Q2 are driven by a control circuit (not shown) to turn on and off alternately at a frequency sufficiently higher than that of the AC voltage source. When switching element Q1 is on, a current will flow from capacitor Cdc through switching element Q1, capacitor Cc, inductor Lr, the bridge circuit, and back to capacitor Cdc. When switching element Q2 is on, a current will flow from capacitor Cc through switching element Q2, the bridge circuit, inductor Lr and back to capacitor Cc. Thus, the high frequency current will flow through the resonant circuit composed of inductor Lr and the bridge circuit.

The circuit of FIG. 2 includes a resonant system composed of inductor Lr and capacitors Cr1 and Cr2, and another resonant system composed inductor Lr and capacitor Cr3 and Cr4. Since both of the resonant system receives the common the high frequency voltage, voltage Va at connection of capacitors Cr1 and Cr2 is of the same amplitude and phase as those of voltage Vb at connection of capacitors Cr3 and Cr4, as shown in FIGS. 3($a$) and 3($b$), in the no-load condition where these capacitors are balanced. Therefore, voltage (Va−Vb) applied to the primary winding n1 of feedback transformer TF becomes almost zero, as shown in FIG. 3($c$). FIG. 4 shows waveforms of voltage Va superimposed on voltage Vb and voltage difference (Va−Vb). Thus, induced voltage at the secondary winding n2 will become approximately zero so that capacitor Cin once being charged receives no further charging and discharging, therefore preventing capacitor Cdc from developing thereacross a voltage exceeding the peak value of the output voltage of rectifier DB.

While, on the other hand, upon connection of the load to capacitor Cr2, the above balancing is broken to give either a difference between voltage Va at connection of Cr1 and Cr2 and voltage Vb at connection of Cr3 and Cr4, as shown in FIG. 5, or a phase difference therebetween, as shown in FIG. 6. In this consequence, the primary winding n1 of feedback transformer TF receives an increased voltage (Va−Vb), as shown in FIGS. 5 and 6, thereby inducing an increased voltage at the secondary winding n2 for charging and discharging capacitor Cin. Thus, the input current will flow continuously from the AC voltage source in the high frequency mode to restrain increase in the input current distortion.

When a discharge lamp is connected as the load L, the no-load condition appears before the lamp is started as is the case where the lamp is disconnected. During such no-load condition prior to starting the lamp, there arises a certain power consumption due to a circuit loss, and/or preheating of filaments, if any. Consequently, it is required to flow a corresponding input current by slightly unbalancing capacitors Cr1 to Cr4 of the bridge circuit. However, such slight unbalancing of capacitors will not cause an substantial increase in the voltage across capacitor Cdc. When capacitor Cdc is permitted to have a certain voltage increase, the unbalancing of capacitors may be made to such an extent that the voltage developed across capacitor Cdc is maintained within a permissible range. Thus, it is possible to adjust the voltage across capacitor Cdc simply by selecting capacitance for capacitors Cr1 to Cr4 and without varying other circuit parameters and switching frequency of switching elements Q1 and Q2, which enhances design flexibility of the circuit.

When more than one load L is connected, the loads may be connected to any one of capacitors Cr1 to Cr4. For example, two loads L can be connected in parallel respectively with Crs2 and Cr3, or with Cr1 and Cr2, as shown in FIGS. 7 and 8. With this configuration, it is possible to use plural loads L of different ratings by setting the capacitance of capacitors Cr1 to Cr4 in accordance with the ratings of the loads L and without requiring any additional circuit configuration.

As a matter of course, it is quite possible to modify the other circuit arrangement while keeping the above operations. For example, the order of capacitor Cin and secondary winding n2, and the order of capacitor Cc and inductor Lr may be reversed, respectively.

Second Embodiment

As shown in FIG. 9, the second embodiment is configured to employ two inductors Lr1 and Lr2 and capacitors Cr5 and Cr6 for the impedance elements Z1 to Z4 of the bridge circuit of the first embodiment of FIG. 1. One arm of the bridge is defined by a series resonant circuit of inductor Lr1 and capacitor Cr5, while the other arm is defined by a series resonant circuit of inductor Lr2 and capacitor Cr6. A primary winding n1 of a feedback transformer TF is connected between a connection of inductor Lr1 and Lr2 in the one arm and a connection of capacitors Cr5 and Cr6 in the other arm. A load L is adapted to be connected across capacitor Cr5. The other circuit configurations are identical to those of the first embodiment of FIG. 1.

The bridge circuit of the present invention is balanced when satisfying the following relation.

$$\omega Lr1 \cdot \left(\frac{1}{\omega Cr6}\right) = \omega Lr2 \cdot \left(\frac{1}{\omega Cr5}\right)$$

The above equation can be transformed into a relation that

Lr1·Cr5=Lr2·Cr6 which means that the above series resonant circuits have the same resonant frequency. Therefore, by selecting circuit parameters which give the same resonant frequency to the series resonant circuits, the secondary winding n2 of feedback transformer TF is given no substantial induced voltage in the no-load condition, which limits the voltage increase at capacitor Cdc. When the load L is connected across capacitor Cr5, the above balancing condition is broken to give the induced voltage at the secondary winding n2 so as to flow the input current in the high frequency mode from the AC voltage source, eventually restraining an increase in the input current distortion.

Also in this circuit configuration, the bridge circuit may be unbalanced to a slight extent, i.e., the two series resonant circuits may have slightly different resonance frequencies, as necessary. The other configurations and operations are identical to those of the first embodiment of FIG. 2.

Third Embodiment

As shown in FIG. 10, the present embodiment is configured to couple the output of inverter INV to the input thereof without using the feedback transformer TF utilized in the first embodiment of FIG. 1.

Likewise in the second embodiment of FIG. 9, the present embodiment includes a resonant circuit which is composed of two inductors Lr3 and Lr4 and two capacitors Cr7 and Cr8 and defines two resonant systems, one being a series resonant circuit of inductor Lr3 and capacitor Cr7, and the other being another series resonant circuit of inductor Lr4 and capacitor Cr8. Also included in the circuit are two distortion improving capacitors Cin1 and Cin2 to which capacitors Cr7 and Cr8 of the resonant systems are connected in series, respectively. The series circuit of capacitors Cin1 and Cr7 and the series circuit of capacitors Cin2 and Cr8 are connected respectively across the DC output ends of rectifier DB. The load L is adapted to be connected across capacitor Cr7.

In order to limit the voltage increase at capacitor Cdc in the no-load condition, a setting is made to disable the charge transfer from capacitors Cin1 and Cin2 to capacitor Cdc in the no-load condition. That is, one series resonant circuit, which is defined by combined capacitance of capacitors Cin1, Cin2, and Cr8 arranged in series combination and of capacitor Cr7 in parallel with the series combination and by inductance Lr3, is set to have a resonant frequency different from that of the another resonant circuit, which is defined by combined capacitance of capacitors Cin1, Cin2, and Cr7 arranged in a series combination and of capacitor Cr8 in parallel with the series combination and by inductance Lr4. Also, the switching frequency of switching elements Q1 and Q2 is set between these two resonant frequencies. In view of the above, circuit parameters for the resonant circuit are selected in relation to the switching frequency, as shown in FIGS. 11 and 12. FIG. 11(a) shows voltage across capacitor Cin 1, FIG. 11(b) shows voltage across capacitor Cr7, and FIG. 11(c) shows an alternating component of voltage across a series combination of capacitors Cin1 and Cr7. FIG. 12(a) shows voltage across capacitor Cin2, FIG. 12(b) shows voltage across capacitor Cr8, and FIG. 12(c) shows an alternating component of voltage across a series combination of capacitors Cin2 and Cr8.

Circuit operation is now explained on an assumption that capacitors Cr7 and Cr8 have respective voltages of the same amplitude and capacitors Cin1 and Cin2 are of the same capacitance. At times t1 and t3 in FIGS. 11 and 12, capacitors Cr7 and Cr8 show the positive voltage peak and negative voltage peak, respectively. At time t2, capacitors Cr7 and Cr8 show the negative peak voltage and positive peak voltage, respectively. At times t1 and t3, capacitor Cin1 gives a minimum capacitance and capacitor Cin2 give a maximum capacitance. At time t2, capacitor Cin1 gives a maximum capacitance and capacitor Cin2 gives a minimum capacitance. That is, during period from times t1 to t2, capacitor Cin1 is charged and capacitor Cin2 is discharged, and during period from times t2 to t3, capacitor Cin1 is discharged and capacitor Cin2 is charged. As explained in the above, since capacitors Cr7 and Cr8 accumulate respective voltages of the same amplitude and capacitors Cin1 and Cin2 are of the same capacitance, capacitors Cin1 and Cin2 are charged and discharged by the same capacitance so as to transfer the charge only between capacitors Cin1 and Cin2. That is, capacitors Cin1 and Cin2 will neither participate to draw the input current from the AC voltage source nor to charge capacitor Cdc.

The above operation is made in the no-load condition. However, in the load-connected condition where the load L is connected across capacitor Cr7, capacitor Cr7 exhibits a voltage amplitude different from that in the no-load condition such that capacitors Cr7 and Cr8 are no longer of the same voltage amplitude. Otherwise, since capacitors Cr7 is and Cr8 come to have the respective voltages in out of opposite phase relation from each other, capacitors Cin1 and Cin2 cannot be charged and discharged by the same charge.

As shown in FIG. 13(a), in the no-load condition, the peak value of output voltage |Vin| from rectifier DB is approximately equal to voltage Vdc across capacitor Cdc so that voltage Vx across the series combination of capacitors Cin1 and Cr7 includes no substantial alternating component. In the load-connected condition, however, voltage Vx across the series combination of capacitors Cin1 and Cr7 includes relatively large alternating component, as shown in FIG. 13(b), due to charging and discharging of capacitors Cin1 and Cin2, thereby flowing input current from the AC voltage source and charging capacitor Cdc. That is, voltage Vdc of capacitor Cdc is step up relative to the peak value of output voltage |Vin| from rectifier DB.

As apparent from the above explanation, because of that inductors Lr3 and Lr4 see currents in the opposite directions but of the same amplitude in the no-load condition, there appears no substantial current flowing through switching elements Q1 and Q2. The other circuit configurations are identical to those disclosed in the first embodiment of FIG. 2.

In this embodiment, a setting is made to have capacitors Cr7 and Cr8 accumulating the respective voltages Vcr7 and Vcr8 of approximately the same level and of opposite phases and to have capacitors Cr7 and Cr8 of the same capacitance. However, for an arrangement in which voltages Vcr7 and Vcr8 of capacitors Cr7 and Cr8 are in the opposite phase but of different voltage amplitude, it is also possible to achieve the same operation as explained in the above by adjusting capacitance of capacitors Cr7 and Cr8 in such a manner to give is the same charge and discharging current. Further when capacitor Cdc is permitted to have a certain voltage increase, suitable adjustments could be made to the amplitude or phase of the voltages Vcr7 and Vcr8 across capacitors Cr7 and Cr8.

Fourth Embodiment

As shown in FIG. 14, the present embodiment is configured to couple the input and output of inverter INV through a feedback transformer TF with two primary windings n11 and n12. An inductor Lr5 is included to define a series resonant circuit with capacitor Cr9. The primary windings n11 and n12 of feedback transformer TF are inserted between inductor Lr5 and capacitor Cr9. The primary windings n11 and n12 have the same number of turns and are coupled to each other at the starting ends or finishing ends of the respective windings in an anti-series relation. The load L is adapted to be connected in parallel with a series combination of capacitor Cr9 and the one primary winding n12.

In this circuit configuration where the series combination of the primary windings n11 and n12 of feedback transformer TF is inserted in a path for a high frequency current on the output side of inverter INV, and the primary windings n11 and n12 having the same number of turns are connected in the anti-series relation, voltages induced at the secondary winding n2 respectively by the two primary windings n11 and n12 will cancel each other, thereby inducing no voltage at the secondary winding n2. Thus, capacitor Cin is not charged and discharged so as to limit the voltage increase at capacitor Cdc.

In the load-connected condition, on the other hand, the one primary winding n11 sees a combined current of that through load L and that through capacitor Cr9, while the other primary winding n12 sees a current flowing only through capacitor Cr9. Thus, there occurs a difference between the currents flowing through the primary windings n11 and n12 to give a resulting induced voltage to the secondary winding n2. With this result, a charging current will flow from the AC voltage source to capacitor Cin so as to restrain the input current distortion. Also, as a result of discharging capacitor Cin, capacitor Cdc is charged.

It is possible to alter the positions of the primary windings n1 and n12 within an extent of assuring the above operation. That is, the primary winding n11 may be located anywhere provided that the both primary windings n11 and n12 are coupled between switching elements Q1 and Q2 and the load L is coupled across the series combination of the primary winding n12 and capacitor Cr9. For example, it is possible to insert both the primary windings n11 and n12 between the source of switching element Q2 and capacitor Cr9, or to insert the primary winding n11 between the source of switching element Q2 and capacitor Cr9 while inserting the other primary winding n12 between inductor Lr5 and capacitor Cr9, or to insert the primary winding n11 between drain of switching element Q2 and capacitor Cc while inserting the other primary winding n12 between inductor Lr5 and capacitor Cr9.

The primary windings n11 and n12 are not necessarily to have the same number of turns and may have different numbers of turns within a permissible range when capacitor Cdc is permitted to have a certain voltage increase. The other circuit configurations and operations are identical to those of the first embodiment.

In addition, feedback transformer TF and inductor Lr5 may have respective windings wound commonly around a single core Co, as shown in FIG. 15, to form a single isolation transformer. In detail, the core Co is composed of two members of EE-type or EI-type into a configuration having a center core m and two opposite side cores s. The primary windings n11 and n12 as well as the secondary winding n2 of feedback transformer TF are wound around the center core m, while the winding n5 of inductor Lr5 is wound around one of the side cores s. Also, the one primary winding n11 is connected to have the polarity opposite to the other windings n12, n2 and n5. That is, terminals A to G shown in FIG. 15 are connected to positions indicated by the same symbols shown in FIG. 16 so that direction of magnetic flux developed by the primary winding n11 opposes to the direction of magnetic flux developed by the other windings n12, n2, and n5 in the circuit of FIG. 16.

When using feedback transformer TF and inductor Lr5 shown in FIG. 15, it is required to set the numbers of turns for the individual windings n11, n12, and n5 in order to cancel two magnetic fluxes with each other in the no-load condition, one magnetic flux being developed at inductor Lr5 and the primary winding n12 by the current flowing through inductor Lr5 and both the primary windings n11 and n12, and the other magnetic flux being developed at the primary winding n11 by the same current. With this result, no apparent voltage is induced at the secondary winding n2 in the no-load condition, thereby limiting the voltage increase across capacitor Cdc. When the load L is connected, the current flowing through the series combination of the winding n5 of inductor Lr5 and the primary winding n11 will shunt through the primary winding n12 and through the load L to thereby induce the voltage at the secondary winding n2 for achieving the same operation as with the circuit configuration of FIG. 14. When using the core Co common to feedback transformer TF and inductor Lr5 in the illustrated fashion, it is possible to reduce the number of components and make the device compact correspondingly.

Fifth Embodiment

As shown in FIG. 17, the present embodiment is configured to use, for the circuit of FIG. 9, a feedback transformer TF having two primary windings n13 and n14 which are inserted respectively between inductor Lr1 and capacitor Cr5 and between inductor Lr2 and capacitor Cr6. The primary windings n13 and n14 are arranged to have the opposite polarity in order to cancel two magnetic fluxes with each other, which are developed respectively at the primary windings n13 and n14 in response to the currents flowing in the same direction through a series resonant circuit of inductor Lr1 and Cr5 and through a series resonant circuit of inductor Lr2 and Cr6. These two series resonant circuits are set to have the same resonance frequency. Provided that there is an inductance relation of 1:n between inductors Lr1 and Lr2, the primary windings n13 and n14 of feedback transformer TF are set to have a winding ratio of n:1. The load L is adapted to be connected in parallel with capacitor Cr5.

With the above relationship, the magnetic fluxes developed at the primary windings n13 and n14 of feedback transformer in the no-load condition cancel each other so as not to induce voltage at the secondary winding n2, thereby drawing no substantial input current from the AC voltage source and therefore restraining the voltage increase across capacitor Cdc. When the load L is connected across capacitor Cr5, there occurs a difference in amplitude or phase between the currents flowing individually through the primary windings n13 and n14 of feedback transformer TF, causing the secondary winding n2 to induce a relatively large voltage for restraining the increase of the input current distortion. That is, in the like manner as in the previous embodiments, it can be made to draw no substantial current from the AC voltage source in the no-load condition to limit the voltage increase at capacitor Cdc, while allowing to flow the input current from the AC voltage source in a high frequency mode in the load-connected condition to restrain the increase of the input current distortion. Also with circuit configuration, it is possible to adjust the winding ratio of the primary windings n13 and n14 to achieve the intended operation in case that the currents flowing respectively through the primary windings n13 and n14 show different amplitudes from each other. Thus, a circuit design can be made easy. The other circuit configurations and operations are identical to those of the first embodiment.

Sixth Embodiment

As shown in FIG. 18, the present embodiment is similar to the fifth embodiment except that the primary windings n13 and n14 of feedback transformer TF are made to have polarity opposite to the fifth embodiment. The two series resonant circuits, one composed of inductor Lr7 and capacitor Cr11 and the other composed of inductor Lr8 and capacitor Cr12, are set to have different resonance frequencies. The switching frequency of switching elements Q1 and Q2 are set between the two resonance frequencies. The switching frequency and the two resonance frequencies are selected in order to flow the currents individually through inductors Lr7 and Lr8 in an opposite phase relation with each other. Provided that there is an inductance relation of 1:n between inductors Lr7 and Lr8, the primary windings n13 and n14 of feedback transformer TF are set to have a winding ratio of n:1.

With this relationship, the magnetic fluxes developed at the primary windings n13 and n14 in the no-load condition cancel each other so as not to induce voltage at the secondary winding n2, thereby limiting the voltage increase across capacitor Cdc. When the load L is connected across capacitor Cr5, the above relation is no longer effective so that secondary winding n2 induces a voltage in response to differing magnetic fluxes at the primary windings n13 and n14, thereby restraining the increase of the input current distortion. The other circuit configurations and operations are identical to those of the fifth embodiment.

Further, with the circuit configuration of this embodiment, the high frequency currents flowing individually through the two resonant circuits in the no-load condition are of the opposite phase with each other, so that switching elements Q1 and Q2 of small current capacity can be utilized.

Seventh Embodiment

As shown in FIG. 19, the present embodiment is configured to include no feedback transformer TF, but to connect a distortion improving capacitor Cin in series with capacitor Cr13 across the DC output ends of rectifier DB and to connect a series combination of capacitor Cr13, inductor Lr11, and a DC blocking capacitor Cc across switching element Q2. Also connected across inductor Lr11 is a series combination of inductor Lr12 and capacitor Cr14. The load L is adapted to be connected across capacitor Cr14.

In the absence of inductor Lr12 and capacitor Cr14, capacitor Cin would be charged and discharged when a resonant current flows through the series resonant circuit of inductor Lr11 and capacitor Cr13 in response to switching elements Q1 and Q2 being turned on and off, thereby increasing the voltage across capacitor Cdc above the output voltage of rectifier DB. In order to avoid such voltage increase, the present embodiment is arranged to connect a series combination of inductor Lr12 and capacitor Cr14 across inductor Lr11 and to include a series resonant circuit of inductor Lr12 and two capacitors Cr13 and Cr14.

The series resonant circuit of inductor Lr12 and capacitors Cr13 and Cr14 is set to have a resonance frequency different from that of the other series resonant circuit of inductor Lr11 and capacitor Cr13. The switching frequency of switching elements Q1 and Q2 is selected between these two different resonance frequencies. Circuit parameters and the switching frequency are selected such that the currents, which flow respectively through the resonant circuit of inductor Lr11 and capacitor Cr13 and through the resonant circuit of inductor Lr12 and capacitors Cr12 and Cr14 in the no-load condition, have the same amplitude but are of the opposite phase. With this setting, the two resonant currents flowing through capacitor Cr13 will cancel each other to give a zero voltage across capacitor Cr13.

In consideration of the first embodiment, it is true that capacitor Cin is charged and discharged in response to variation in voltage Vc at a connection between inductor Lr11 and capacitor Cr13. Therefore, amplitude reduction of voltage Vc in the no-load condition can almost stop charging and discharging of capacitor Cin, which eventually limits voltage increase across capacitor Cdc.

When the load L is connected across capacitor Cr14, there occurs a difference in at least one of amplitude and phase between the currents flowing through the resonant circuit of inductor Lr11 and capacitor Cr13 and through the resonant circuit of inductor Lr12 and capacitors Cr13 and Cr14, so that capacitor Cr13 will develop thereacross a large high frequency voltage relative to the voltage across capacitor Cr13. It is by this high frequency voltage that capacitor Cin is charged and discharged to draw the input current from the AC voltage source. Accordingly, this embodiment operates as in the other embodiments to limit the voltage increase at capacitor Cdc in the no-load condition and to flow the input current in the high frequency mode for restraining the increase in the input current distortion in the load-connected condition.

Also in this embodiment, it is possible as in the previous embodiments to differentiate to some extent the amplitude or phase of the two resonant currents respectively flowing through the two series resonant circuits, rather than completely equalizing the amplitude of the currents and opposing the phase thereof, in case where capacitor Cdc is permitted to increase its voltage to a certain limit.

When a discharge lamp is connected as the load L, capacitor Cin sees a less current in the no-load condition before starting the lamp, which in turn flows less current through switching elements Q1 and Q2. In contrast to the prior art circuit in which switching elements Q1 and Q2 see relatively large current before starting the lamp, the present embodiment can reduce current capacity of switching elements Q1 and Q2 before the lamp start, thereby allowing the use of switching elements Q1 and Q2 of small current capacity and less-expensive compared to those required in the prior art circuits.

As shown in FIG. 20, a modification is possible to connect the primary winding n1 of feedback transformer TF across capacitor Cr13 and to connect the secondary winding n2 of feedback transformer TF in series with capacitor Cin for achieving the same operation as in the first embodiment. In this modification, adjustment of the amplitude of the charging-and-discharging current of capacitor Cin can be easily made by varying a winding ratio of the primary winding n1 to the secondary winding n2 of feedback transformer TF, which increases design flexibility, i.e., enables a wide selection of the load L applicable to the circuit. The other circuit configurations and operations are identical to those of the first embodiment.

Eighth Embodiment

As shown in FIG. 21, the present embodiment is a modified version of the seventh embodiment of FIG. 19 and is arranged to connect a series combination of capacitors Cin, Cr13, and Cr14 across the DC output ends of rectifier DB in contrast to the seventh embodiment in which the series combination of capacitors Cin and Cr13 is connected across the DC output ends of rectifier DB. In other words, the present embodiment is contemplated to connect one end of capacitor Cin to a connection between inductor Lr12 and capacitor Cr14, while capacitor Cin of the seventh embodiment is connected at its one end to a connection between inductor Lr11 and capacitor Cr13. The load L is adapted to be connected across capacitor Cr14.

Thus configured circuit is set to give approximately zero voltage amplitude at a connection between inductor Lr12 and capacitor Cr14 in the no-load condition. In detail, a relation is selected among inductors Lr11 and Lr12, capacitors Cr13 and Cr14, and the switching frequency of Q1 and Q2 in order that capacitors Cr13 and Cr14 develop thereacross respective voltages of the same amplitude but in opposite phase. That is, in contrast to the seventh embodiment in which the currents flowing respectively through capacitors Cr13 and Cr14 are determined to have the same amplitude but opposite phase, the present embodiment is designed to develop across capacitors Cr13 and Cr14 the respective voltages of the same amplitude but in opposite phase in the no-load condition.

Thus, the two series connected capacitors Cr13 and Cr14 develop the respective voltages that cancel each other in the no-load condition to give an approximately zero voltage at the connection between inductor Lr12 and capacitor Cr14. With this result, capacitor Cin is hardly charged and discharged to thereby limit the voltage increase across capacitor Cdc. When the load L is connected to capacitor Cr14, there occurs a difference in at least one of amplitude and phase of the voltages developed across capacitors Cr13 and Cr14 so as to give a high frequency voltage of relatively large amplitude across the series combination of capacitors Cr13 and Cr14, thereby charging and discharging capacitor Cin. Accordingly, the input current from the AC voltage source can be fed in a high frequency mode to restrain the increase of the input current distortion.

Likewise as in the previous embodiments, it is possible in the present embodiment to differentiate to some extent the amplitude or phase of the voltages developed across capacitors Cr13 and Cr14 rather than completely equalizing the amplitude of these voltages and opposing the phase thereof, in case where capacitor Cdc is permitted to increase its voltage to a certain limit.

As shown in FIG. 22, a modification is possible to connect the primary winding n1 of feedback transformer TF across the series combination of capacitors Cr13 and Cr14 and to connect the secondary winding n2 of feedback transformer TF in series with capacitor Cin for achieving the same operation as in the first embodiment. In this modification, adjustment of the amplitude of the charging-and-discharging current of capacitor Cin can be easily made by varying a winding ratio of the primary winding n1 to the secondary winding n2 of feedback transformer TF, which increases design flexibility, i.e., enables a wide selection of the load L applicable to the circuit. The other circuit configurations and operations are identical to those of the first embodiment.

Ninth Embodiment

As shown in FIG. 23, the present embodiment includes the two series resonant circuits, one composed of inductor Lr3 and capacitor Cr7, and the other composed of inductor Lr4 and capacitor Cr8 as in the third embodiment of FIG. 10, but utilizes a distortion improving capacitor Cin3, instead of distortion improving capacitors Cin1 and Cin2, and connect the capacitor Cin3 across diode Di. Although the parallel combination of capacitor Cin3 and diode Di is connected in series with the negative DC output end of rectifier DB and capacitor Cdc, it may be inserted anywhere in a path of flowing the high frequency current from the inverter INV, for example, between the positive DC output end of rectifier DB and capacitor Cdc.

With this circuit configuration, capacitor Cin3 is charged when the high frequency current flows in the opposite direction with respect to diode, and the resulting voltage is added to the output voltage of rectifier DB. When such added voltage becomes equal to voltage across capacitor Cdc, the high frequency current will flow through the AC voltage source. As the high frequency current flows, capacitor Cin3 repeats being charged and discharged in accordance with the amplitude of the current so that the input current will flow from the AC voltage source when capacitor Cin3 is being charged. Thus, the input current can be fed from the AC voltage source in the high frequency mode to restrain the increase of the input current distortion. Also, since the voltage across capacitor Cdc is a function of the sum of the voltage across capacitor Cin3 and the output voltage of rectifier DB, it is made as a step-up voltage relative to the output voltage of rectifier. With the provision of giving the step-up voltage, the circuit is enabled to feed the charging current to capacitor Cdc even during a period in which the output from rectifier DB is low, thereby improving the input power factor.

The series resonant circuit of inductor Lr3 and capacitor Cr7 is set to give a resonance frequency different from that of the series resonant circuit of inductor Lr4 and capacitor Cr8. The switching frequency of switching elements Q1 and Q2 is selected between the two resonance frequencies. Circuit parameters and switching frequency are set such that the currents individually flowing through the series resonant circuit of inductor Lr3 and capacitor Cr7 and through the series resonant circuit of inductor Lr4 and capacitor Cr8 are of the same amplitude but in opposite phase in the no-load condition. That is, a relation is established between the currents Ia and Ib respectively flowing through inductors Lr3 and Lr4 with switching frequency f0, as shown in FIG. 24. With this relation, capacitor Cin3 develops nearly zero voltage upon receiving the currents flowing respectively through the series resonant circuits in the no-load condition, as shown in FIGS. 25(a) to 25(c) and FIG. 26. In these FIGS., Ia+Ib denotes a current flowing through capacitor Cin3. As is known from the above, capacitor Cin3 is not charged and discharged in this condition to limit the voltage increase of capacitor Cdc.

When the load L is connected, the current flowing through the series resonant circuit of inductor Lr3 and capacitor Cr7 varies to develop across capacitor Cin3 a high frequency voltage of relatively large amplitude. With this result, the input current from the AC voltage source flows in the high frequency mode to restrain the increase of the input current distortion. The other circuit configurations and operations are identical to those of the first embodiment.

Also in this embodiment, the above relation may not have to be satisfied strictly when capacitor Cdc is permitted to have a certain voltage increase. In such case, voltage across capacitor Cdc may be determined by suitably modifying the above relation.

When a discharge lamp is connected as the load L, capacitor Cin sees a less current in the no-load condition before starting the lamp and a correspondingly less current flows through switching elements Q1 and Q2. Thus, it is possible to use switching elements Q1 and Q2 of small current capacity and less-expensive.

Tenth Embodiment

As shown in FIG. 27, the present embodiment is configured to insert inductors Lr13 and Lr14 respectively between the one DC output end of rectifier DB and capacitor Cdc and between the other DC output end of rectifier DB and capacitor Cdc, and to connect a series combination of capacitors Cr15 and Cr16 across the DC output ends of rectifier DB. A pair of series connected switching elements Q1 and Q2 is connected across capacitor Cdc as in the previous embodiments. Switching elements Q1 and Q2 are driven by a control circuit to turn on and off alternately at a frequency sufficiently higher than that of the AC voltage source. A DC blocking capacitor Cc is inserted between a connection of switching elements Q1 and Q2 and a connection of capacitors Cr15 and Cr16. The load L is adapted to be connected across capacitor Cr15.

Circuit parameters are selected to satisfy a relation that Lr13·Cr15=Lr14·Cr16 and to equalize the resonance frequencies of the series resonant circuit of inductor Lr13 and capacitor Cr15 and of the resonant circuit of inductor Lr14 and capacitor Cr16.

Operation of the circuit of FIG. 27 is now explained. Firstly, a steady operation with the load connected is explained. As shown by one-point dotted lines in FIG. 28, when switching element Q1 is on, a current flows from capacitor Cdc through switching element Q1, capacitor Cc, capacitor Cr15 and load L, and inductor Lr13, and back to capacitor Cdc, to increase voltage across capacitor Cr15. Also at this time, a current flows, as shown by evenly dotted lines in FIG. 28, from capacitor Cr16 through inductor Lr14, switching element Q1 and capacitor Cc, and back to capacitor Cr16, to lower the voltage across capacitor Cr16.

As the load L is connected in circuit, capacitor Cr15 develops thereacross a voltage which is different in amplitude and/or phase from a voltage developed across capacitor Cr16 so that a voltage across the series combination of capacitors Cr15 and Cr16 will vary during the on-period of switching element Q1. When the voltage across the series combination of capacitors Cr15 and Cr16 becomes lower than the voltage across rectifier DB, a current will flow, as shown by arrowed solid lines in FIG. 29, from rectifier DB through inductor Lr14, switching element Q1, capacitor Cc, capacitor Cr5 and load L, and back to rectifier DB. This means that the input current from the AC voltage source flows over a period in correspondence to varying voltage developed across the series combination of capacitors Cr15 and Cr16. Thus, the input current flows in the high frequency mode to restrain the increase of the input current distortion.

When switching element Q2 is on, a current flows, as shown by one-point dotted lines in FIG. 30, from capacitor Cr15 through capacitor Cc, switching element Q2, and inductor Lr13 to lower the voltage accumulated across capacitor Cr15. Simultaneously, as shown by evenly dotted lines in FIG. 30, a current flows from capacitor Cdc through inductor Lr14, capacitor Cr16, and capacitor Cc to raise the voltage across capacitor Cr16.

Therefore, the voltage developed across the series combination of capacitor Cr15 and Cr16 will vary also in the on-period of switching element Q2 being on, in the like fashion as in the on-period of switching element Q1. When the voltage across the series combination of capacitors Cr15 and Cr16 becomes lower than the voltage across rectifier DB, a current will flow, as shown by arrowed solid lines in FIG. 31, from rectifier DB through capacitor Cr16, capacitor Cc, switching element Q2, and inductor Lr13, and back to rectifier DB. With this result, the input current from the AC voltage source flows in the high frequency mode to restrain the increase of the input current distortion.

Accordingly, as shown in FIG. 32(b), a relation is established, with reference to the voltage waveform of the AC voltage source shown in FIG. 32(a), among output voltage Vdb of rectifier DB, and voltage Vd across the series combination of capacitors Cr15 and Cr16. FIG. 32(c) is an enlarged fragment of a portion of FIG. 32(b) and shows a variation of voltage Vd across the series combination of capacitors Cr15 and Cr16 within a short time period where no substantial variation is seen in the output voltage Vdb of rectifier DB.

While on the other hand, in the no-load condition, voltages of the same amplitude but in opposite phase appear respectively across capacitors Cr15 and Cr16. Accordingly, voltage across the series combination of capacitors Cr15 and Cr16 is kept at a constant level approximately equal to the voltage of capacitor Cdc. This means that the input current from the AC voltage source flows only while the voltage of the AC voltage source is around its peak, thereby limiting the increase of the voltage across capacitor Cdc.

As explained in the above, the present embodiment can assure to flow the input current in the high frequency mode to restrain the increase of the input current distortion in the load-connected condition as well as to limit the voltage increase of capacitor Cdc in the no-load condition.

A modification of the present embodiment is shown in FIG. 33 in which inductors Lr15 and Lr16 are added to be connected in series respectively with capacitors Cr15 and Cr16 and in which the series combination of capacitors Cr15 and Cr16 and inductors Lr15 and Lr16 is connected across the DC output ends of rectifier DB. In other words, this modification is identical to the circuit of FIG. 27 except that the series combination of capacitor Cr15 and inductor Lr15 is utilized instead of a single capacitor Cr15 and the series combination of capacitor Cr16 and inductor Lr16 instead of a single capacitor Cr16. This modification, therefore, requires a relation that (Lr13+Lr15)·Cr15=(Lr14+Lr16)·Cr16. The other circuit configurations and operations are identical to those of FIG. 27.

Eleventh Embodiment

As shown in FIG. 34, the present embodiment is configured to connect smoothing capacitor Cdc across the DC output ends of rectifier DB through diode Di and to connect a series combination of switching elements Q1 and Q2 of inverter INV across capacitor Cdc. Also connected across capacitor Cdc is a series combination of four capacitors Cr21 to Cr24. A DC-blocking capacitor Cc is connected in series with inductor Lr21 between a connection of switching elements Q1 and Q2 and a connection of capacitors Cr21 and Cr23. The connection of capacitors Cr21 and Cr23 is a mid point between the four series connected capacitors Cr21 to Cr24. Further, feedback transformer TF is included in circuit to have its primary winding n1 connected in series with a capacitor Ce across the series combination of capacitors Cr21 and Cr23. The secondary winding n2 of feedback transformer TF is connected in series with a distortion improving capacitor Cin across the DC output ends of rectifier DB. The load L is adapted to be connected across capacitor Cr22. The load L is not necessary connected across the particular capacitor Cr22 and may be equally connected across any one of capacitors Cr21 to Cr24.

As is clear from the above circuit configuration, the present embodiment includes a specific arrangement that the series combination of the four capacitors Cr21 to Cr24 is connected across capacitor Cdc in contrast to the first embodiment of FIG. 2 in which the bridge circuit of capacitors Cr1 to Cr4 is inserted between the output of inverter INV and the primary winding n1 of feedback transformer TF. The other basic circuit configurations are identical to the first embodiment.

Circuit parameters are selected to satisfy a relation that Cr21·Cr24=Cr23·Cr22. Accordingly, in the no-load condition, capacitor Cr21 develops thereacross a high frequency voltage of which alternating component has the same amplitude but opposite phase to an alternating component of voltage developed across capacitor Cr23. That is, as the voltage at connection of capacitors Cr21 and Cr22 varies as shown in FIG. 35(a), voltage at connection of capacitors Cr23 and Cr24 will vary, as shown in FIG. 35(b). Therefore, only a DC voltage difference appears between these connections so as to reduce a high frequency voltage applied to the series combination of the primary winding n1 and capacitor Ce. With this result, the secondary winding n2 induces a voltage of less amplitude which is not sufficient to charge and discharge capacitor Cin, thereby limiting the increase of the voltage across capacitor Cdc. Capacitor Ce is provided for blocking a DC current from flowing through the primary winding n1.

When the load is connected, the above relation is no longer satisfied such that the high frequency voltage at the connection of capacitors Cr21 and Cr22 will have different amplitude or become out of opposite phase relation to the high frequency voltage at the connection of capacitors Cr23 and Cr24. Thus, there appears a resulting high frequency voltage of relatively large amplitude across the series combination of the primary winding n1 and capacitor Ce, which induces a high frequency voltage at the secondary winding n2. Consequently, capacitor Cin becomes being charged and discharged to flow the input current from the AC voltage source in the high frequency mode for restraining the increase of the input current distortion. The other circuit configurations and operations are identical to those of the first embodiment.

Further, the present embodiment is configured to have a resonant circuit which is composed of inductor Lr21, capacitors Cr23 and Cr24 and which is connected across switching element Q1, and to have a resonant circuit which is composed of inductor Lr21, capacitors Cr21 and Cr22 and which is connected across switching element Q2. Thus, upon being turned on, each of switching elements Q1 and Q2 can flow a current through capacitor Cdc, increasing a ratio of utilizing capacitor Cdc and therefore reducing a ripple current.

Also in this embodiment, the above relation may not have to be satisfied strictly when capacitor Cdc is permitted to have a certain voltage increase. In such case, a capacitance ratio of capacitors Cr21 to Cr24 may be suitably adjusted within such an extent as not to increase the voltage of capacitor Cdc above the permissible limit. Further, since the present embodiment enables to control the voltage across capacitor Cdc only by adjusting the capacitance ratio of capacitors Cr21 to Cr24, enhanced design flexibility is expected.

The circuit arrangement of FIG. 34 may be modified within an extent of achieving the like operation as explained in the above. For example, the order of the secondary winding n2 and capacitor Cin may be reversed, diode Di may be disposed on the negative side of capacitor Cdc, and the order of inductor Lr21 and capacitor Cc may be reversed. When two or more loads L1 and L2 are connected, as shown in FIGS. 36 and 37, the loads L may be connected to any respective ones of capacitors Cr21 to Cr24. FIG. 36 shows the loads L1 and L2 connected respectively across capacitors Cr21 and Cr22, while FIG. 37 shows the loads L1 and L2 connected respectively across capacitors Cr22 and Cr23.

Twelfth Embodiment

As shown in FIG. 38, the present embodiment is similar to the eleventh embodiment of FIG. 34 but is arranged to substitute inductors Lr22 and Lr24 for capacitors Cr22 and Cr24. In detail, a series resonant circuit of capacitor Cr21 and inductor Lr22 is connected in series with a series combination of switching element Q1 and capacitor Cc across capacitor Cdc, and another series resonant circuit of capacitor Cr23 and inductor Lr24 is connected in series with a series combination of switching element Q2 and capacitor Cc across capacitor Cdc. Thus configured circuit is set to make the resonance frequency of the series resonant circuit of Cr21 and inductor L22 equal to that of the series resonant circuit of Cr23 and inductor Lr24. Because of that the resonant circuits are made of capacitors Cr21 and Cr23 and inductors Lr23 and Lr24, inductor Lr21 utilized in the circuit of FIG. 34 is not necessary. The other circuit configurations are identical to those of the eleventh embodiment.

Thus, in the no-load condition, the voltage at the connection of capacitor Cr21 and inductor Lr22 is made to have the same amplitude but opposite phase to the voltage at the connection of capacitor Cr23 and inductor Lr24, such that a DC voltage free from the high frequency component appears across the series combination of the primary winding n1 of feedback transformer TF and capacitor Ce. Such DC voltage is removed of its DC component by capacitor Ce when applied to the primary winding n1 of feedback transformer TF, so that the primary winding n1 receives no DC current and is therefore free from being heated, in addition to causing no induced high frequency voltage at the secondary winding n2. Consequently, no input current will flow from the AC voltage source to limit the increase of the voltage across capacitor Cdc.

When the load L is connected across capacitor Cr21, the current flowing through the one series resonant circuit will differ in amplitude or be out of opposite phase relation to the current flowing through the other series resonant circuit. Therefore, a high frequency voltage is applied across the series combination of the primary winding n1 and capacitor Ce, inducing the resulting high frequency voltage at the secondary winding n2. Thus, the input current flows in the high frequency mode from the AC voltage source to restrain the increase of the input current distortion.

In the present embodiment, the two series resonant circuits are made respectively of capacitor Cr21 and inductor Lr22, and of capacitor Cr23 and inductor Lr24, however, it is equally possible, as shown in FIG. 39, to provide two series resonant circuits respectively composed of capacitor Cr22 and inductor Lr21 and of capacitor Cr24 and inductor Lr23. The load L may be connected across any one of the components forming the series resonant circuits. For example, it may be connected across one of inductors Lr21 to Lr24, rather than across capacitors Cr21 to Cr24.

Also in this embodiment, the resonance frequencies of the two series resonant circuits is not necessarily identical to each other when capacitor Cdc is permitted to have a certain voltage increase. In such case, the resonance frequencies may be suitably adjusted within such an extent as not to increase the voltage of capacitor Cdc above the permissible limit. The other circuit configurations and operations are identical to the eleventh embodiment of FIG. 34.

Thirteenth Embodiment

As shown in FIG. 40, the present embodiment is configured to connect smoothing capacitor Cdc through diode Di across the DC output ends of rectifier DB, and to connect a series connected pair of switching elements Q1 and Q2 of inverter INV across capacitor Cdc. Also connected across capacitor Cdc is two primary windings n11 and n12 of feedback transformer TF which are connected respectively in series with capacitors Cr25 and Cr26. The primary windings n11 and n12 and capacitors Cr25 and Cr26 are connected in series across capacitor Cdc.

The primary windings n11 and n12 are directly connected. A series combination of capacitor Cc and inductor Lr25 is inserted between a connection of primary windings n11 and n12 and a connection of switching elements Q1 and Q2. Further, the primary windings n11 and n12 are connected in such a manner as to cancel magnetic fluxes developed respectively at these windings with each other when receiving individual currents from the connection of the windings. That is, the primary windings n11 and n12 are coupled with the starting end of the one winding connected directly to the finishing end of the other winding. Provided that there is a capacitance relation of n:1 between capacitors Cr25 and Cr26, the primary windings n11 and n12 are set to have a winding ratio of 1:n. A series combination of DC blocking capacitor Cc and inductor Lr25 is inserted between the connection of switching elements Q1 and Q2 and the connection of the primary windings n11 and n12. The secondary winding n2 of feedback transformer TF is connected in series with a distortion improving capacitor Cin across the DC output ends of rectifier DB. The load L is adapted to be connected across capacitor Cr25.

With the above configuration, the magnetic fluxes produced by the individual currents flowing through the primary windings n11 and n12 are canceled with each other in the no-load condition to thereby induce no high frequency voltage at the secondary winding n2. Accordingly, capacitor Cin is free from being charged and discharged so as to limit voltage increase across capacitor Cdc.

In the load-connected condition, the one primary winding n11 sees a composite current of those through the load L and through capacitor Cr25, while the other primary winding n12 sees only a current flowing through capacitor Cr26. Accordingly, there appear a difference between the currents flowing through the primary windings n11 and n12 to thereby produce an induced voltage at the secondary winding n2. With this result, capacitor Cin receives a charging current from the AC voltage source to restrain the increase of the input current distortion. Capacitor Cdc is charged in response to the discharging of capacitor Cin.

When capacitor Cdc is permitted to have a certain voltage increase, it may be arranged to induce the high frequency voltage at the secondary winding n2 of feedback transformer TF in the no-load condition within a permitted range of not causing the voltage increase of capacitor Cdc above the certain voltage increase.

As shown in FIG. 41, the windings of feedback transformer TF and inductor Lr25 may be wound commonly around a single core Co. In detail, the core Co is composed of two members of EE-type or EI-type into a configuration having a center core m and two opposite side cores s. The primary windings n11 and n12 as well as the secondary winding n2 of feedback transformer TF are wound around the center core m, while the winding n6 of inductor Lr25 is wound around one of the side cores s. Also, the one primary winding n11 is connected to have the polarity opposite to the other windings n12, n2 and n6. That is, terminals A to F shown in FIG. 41 are connected to positions indicated by the same symbols shown in FIG. 42 so that direction of magnetic flux developed by the primary winding n11 opposes to the direction of magnetic flux developed by the other windings n12, n2, and n6 in the circuit of FIG. 42.

When using feedback transformer TF and inductor Lr25 shown in FIG. 41, it is required to set the numbers of turns for the individual windings n11, n12, and n6 in order to cancel two magnetic fluxes with each other in the no-load condition, one magnetic flux being developed at inductor Lr25 and the primary winding n12 by the current flowing through inductor Lr25 and both the primary windings n11 and n12, and the other magnetic flux being developed at the primary winding n11 by the same current. With this result, no apparent voltage is induced at the secondary winding n2 in the no-load condition, thereby limiting the voltage increase across capacitor Cdc. When the load L is connected, the current flowing through the primary winding n11 will shunt through capacitor Cr25 and through the load L to thereby induce the voltage at the secondary winding n2 and flow the corresponding input current from the AC voltage source for restraining the increase of the input current distortion. When using the core Co common to feedback transformer TF and inductor Lr25 in the illustrated fashion, it is possible to reduce the number of components.

Fourteenth Embodiment

As shown in FIG. 43, the present embodiment is similar to the thirteenth embodiment of FIG. 40 but is arranged to connect not only capacitors Cr25 and Cr26 but also inductors Lr27 and Lr28 in series respectively with the primary windings n11 and n12 and to connect inductors Lr27 and Lr28 in series, while eliminating inductor Lr25 utilized in the thirteenth embodiment. That is, a series resonant circuit of capacitor Cr25 and inductor Lr27 is connected in series with the primary winding n11, and another series resonant circuit of capacitor Cr26 and inductor Lr28 is connected in series with the primary winding n12. The primary windings n11 and n12 are connected in such a manner as to cancel magnetic fluxes developed at these windings with each other when receiving individual currents from the connection of the windings. That is, the primary windings n11 and n12 are coupled with the starting end of the one winding connected directly to the finishing end of the other winding. The two resonant circuits are designated to have the same resonance frequency. Provided that there is a relation of 1:n between the currents flowing through Lr27 and Lr28, the primary windings n11 and n12 are set to have a winding ratio of n:1. The load L is adapted to be connected across capacitor Cr25.

In the circuit of FIG. 43 with the above settings, the magnetic fluxes produced by the individual currents flowing through the primary windings n11 and n12 are canceled with each other in the no-load condition to thereby induce no high frequency voltage at the secondary winding n2. Accordingly, capacitor Cin is free from being charged and discharged so as to limit the increase of the voltage across capacitor Cdc.

In the load-connected condition, the secondary winding n2 induces a high frequency voltage for charging and discharging capacitor Cin, thereby flowing the input current from the AC voltage source in the high frequency mode to restrain the increase of the input current distortion. The other circuit configurations and operations are identical to those of the thirteenth embodiment.

We claim:

1. A power supply device comprising:
   rectifier means for rectification of an AC voltage from an AC voltage source into an output DC voltage across DC output ends of said rectifier means;
   a smoothing capacitor connected across said DC output ends of said rectifier means to smooth said output DC voltage from said rectifier means for providing a smoothed DC voltage;

an inverter including resonant means with first and second resonant systems, said inverter being supplied with said smoothed DC voltage from the smoothing capacitor to provide high frequency powers respectively to said first and second resonant systems, said first resonant system including an impedance element connected across a load circuit for applying the corresponding high frequency power to said load circuit;

balancing means which combines the high frequency powers fed respectively through said first and second resonant systems in a direction of canceling the high frequency powers with each other to provide a combined high frequency power;

feedback means which superimposes said combined high frequency power upon said output DC voltage from said rectifier to feedback the resulting power to an input of said inverter for flowing a charge current for said smoothing capacitor;

said first and second resonant systems being arranged to vary an amount of said combined high frequency power provided from said balancing means in response to a load condition of said load circuit for reducing the canceling effect at said balancing means as said high frequency power supplied to said load circuit increases.

2. The power supply device as set forth in claim 1, wherein said inverter comprises a pair of first and second switching elements connected in series across said smoothing capacitor and having resonant means composed of first and second resonance systems each of which has an impedance element and each of which is connected across said first switching element, said first and second switching elements being driven to turn on and off alternately to output high frequency powers to said first and second resonant systems and applying a corresponding high frequency power to a load circuit connected across said impedance element of said first resonant system;

said resonant means being in the form of a bridge circuit which includes said first resonant system and said second resonant system, said first resonant system having impedance which varies to a greater extent than said second resonant system in accordance with a varying load condition of said load circuit;

said balancing means operating to feedback, through said feedback means, an output of said bridge circuit to the input of said inverter;

said bridge circuit being arranged to vary a canceling effect at said balancing means to increase the feedback amount of said high frequency power as said high frequency power supplied to said load circuit increases.

3. The power supply device as set forth in claim 1, wherein said feedback means and said balancing means are coupled in a single isolation transformer.

4. The power supply device as set forth in claim 1, wherein said inverter comprises a pair of first and second switching elements connected in series across said smoothing capacitor and having resonant means composed of first and second resonance systems each of which has an impedance element and each of which is connected across one of said first switching elements, said first and second switching elements being driven to turn on and off alternately to output high frequency powers to said first and second resonant systems and applying a corresponding high frequency power to a load circuit connected across said impedance element of said first resonant system;

one of said first and second resonant systems having a resonance frequency higher than an output frequency of said inverter, and the other of said first and second resonant systems having a resonance frequency lower than the output frequency of said inverter;

said first resonant system being connected to said load circuit through said impedance element to vary its resonance frequency in accordance with a load condition of said load circuit;

said first and second resonant systems being arranged to vary a canceling effect at said balancing means to increase the feedback amount of said high frequency power as said high frequency power supplied to said load circuit increases.

5. The power supply device as set forth in claim 1, wherein said inverter comprises a pair of first and second switching elements connected in series across said smoothing capacitor and having resonant means composed of first and second resonance systems each having impedance element and connected across one of said first switching elements, said first and second switching elements being driven to turn on and off alternately to output high frequency powers to said first and second resonant systems and applying a corresponding high frequency power to a load circuit connected across said impedance element of said first resonant system;

said first resonant system having impedance which varies to a greater extent than said second resonant system in accordance with a varying load condition of said load circuit;

said first and second resonant systems having at least one points connected commonly to one end of a feedback capacitor forming said feedback means, the other end of said feedback capacitor being connoted to a connection between said rectifier means and said second switching element;

said first and second resonant systems being arranged to vary a canceling effect at said balancing means to increase the feedback amount of said high frequency power as said high frequency power supplied to said load circuit increases.

6. The power supply device as set forth in claim 5, wherein said feedback means comprises a parallel combination of a diode and a feedback capacitor, and is connected between said rectifier means and said smoothing capacitor in such a polarity relation as to flow a charging current to said smoothing capacitor.

7. The power supply device as set forth in claim 1, wherein said inverter comprises a pair of first and second switching elements connected in series across said smoothing capacitor and having resonant means composed of first and second resonance systems each of which has an impedance element and each of which is connected across each one of said first and second switching elements, said first and second switching elements being driven to turn on and off alternately to output high frequency powers to said first and second resonant systems and applying a corresponding high frequency power to a load circuit connected across said impedance element of said first resonant system;

said first resonant system having impedance which varies to a greater extent than said second resonant system in accordance with a varying load condition of said load circuit;

said first and second resonant systems having individual resonant inductors at least portions of which are connected respectively between the one DC output end of said rectifier and said smoothing capacitor and between the other DC output end of said rectifier and said smoothing capacitor so as to define said feedback means;

said first and second resonant systems being arranged to vary a canceling effect at said balancing means to increase the feedback amount of said high frequency power as said high frequency power supplied to said load circuit increases.

8. The power supply device as set forth in claim 1, wherein said inverter comprises a pair of first and second switching elements connected in series across said smoothing capacitor and having resonant means composed of first and second resonance systems each of which has an impedance element and each of which is connected across each one of said first and second switching elements, said first and second switching elements being driven to turn on and off alternately to output high frequency powers to said first and second resonant systems and applying a corresponding high frequency power to a load circuit connected across said impedance element of said first resonant system;

said first resonant system being connected to said load circuit through said impedance element to vary its impedance in accordance with a varying load condition of said load circuit;

said balancing means being defined by an isolation transformer which combines resonance voltages or currents developed respectively at said first and second resonant systems;

said feedback means comprising a series combination of a secondary winding of said isolation former and a feedback capacitor connected across the output DC ends of said rectifier;

said first and second resonant systems being arranged to vary a canceling effect at said balancing means to increase the feedback amount of said high frequency power as said high frequency power supplied to said load circuit increases.

9. The power supply device as set forth in claim 1, wherein said load circuit includes a discharge lamp.

* * * * *

UNITED STATES PATENT AND TRADEMARK OFFICE
CERTIFICATE OF CORRECTION

PATENT NO.   : 5,995,398
DATED        : November 30, 1999
INVENTOR(S)  : T. Yamauchi, et. al.

It is certified that error appears in the above-indentified patent and that said Letters Patent is hereby corrected as shown below:

Title page, item [56], References Cited, insert --

| | | | |
|---|---|---|---|
| 5,644,480 | 7/1997 | Sako et al. | 363/17 |
| 4,677,345 | 6/1987 | Nilssen | 363/132x |
| 3,753,071 | 8/1973 | Engel et al. | 363/37 |

--

Signed and Sealed this

Twentieth Day of March, 2001

Attest:

NICHOLAS P. GODICI

*Attesting Officer*          Acting Director of the United States Patent and Trademark Office